US012695189B2

(12) United States Patent
Kulkarni et al.

(10) Patent No.: US 12,695,189 B2
(45) Date of Patent: Jul. 28, 2026

(54) PRINTED CIRCUIT BOARD IMPLEMENTED MULTIBAND ANTENNA

(71) Applicant: Honeywell International Inc., Charlotte, NC (US)

(72) Inventors: Amit B. Kulkarni, Duluth, GA (US); Justin Jose, Kerala (IN); Prasad Samudrala, Suwanee, GA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 199 days.

(21) Appl. No.: 18/410,602

(22) Filed: Jan. 11, 2024

(65) Prior Publication Data

US 2025/0233305 A1 Jul. 17, 2025

(51) Int. Cl.
*H01Q 5/30* (2015.01)
*H01Q 5/28* (2015.01)

(52) U.S. Cl.
CPC ................. *H01Q 5/30* (2015.01); *H01Q 5/28* (2015.01)

(58) Field of Classification Search
CPC ............ H01Q 5/30; H01Q 5/28; H01Q 5/371; H01Q 1/38; H01Q 9/42; H01Q 9/40
See application file for complete search history.

(56) References Cited

U.S. PATENT DOCUMENTS

| | | | |
|---|---|---|---|
| 191,512 | A | 6/1877 | Bennett |
| 2,016,004 | A | 10/1935 | Gay |
| 3,974,492 | A | 8/1976 | Girismen |
| 4,009,647 | A | 3/1977 | Howorth |
| 4,046,532 | A | 9/1977 | Nelson |
| 4,341,345 | A | 7/1982 | Hammer et al. |
| 4,345,162 | A | 8/1982 | Hammer et al. |

(Continued)

FOREIGN PATENT DOCUMENTS

| | | | |
|---|---|---|---|
| CA | 2387100 | A1 | 11/2003 |
| CA | 2538139 | A1 | 3/2005 |

(Continued)

OTHER PUBLICATIONS

Ahn et al., "A Compact Printed Dual-Band WLAN Antenna with a Shorted Coupling Strip for Mobile Terminals." Proceedings of APMC 2012, Kaosiung, Taiwan, pp. 313-315, Dec. 4-7, 2012.

(Continued)

*Primary Examiner* — Seokjin Kim
(74) *Attorney, Agent, or Firm* — Seager, Tufte & Wickhem, LLP

(57) ABSTRACT

A printed circuit board implemented antenna includes an antenna leg supported by a printed circuit board having a plurality of different metal layers. The antenna leg has a length extending between a first end and a second end of the antenna leg. The antenna leg includes a plurality of series connected metal segments. Each of at least two of the plurality of series connected metal segments is electrically connected to at least two neighboring metal segment of the plurality of series connected metal segments, and wherein each of the at least two of the plurality of series connected metal segments is formed on a different metal layer of the printed circuit board than each of the at least two neighboring metal segment and is connected to each of the at least two neighboring metal segment through one or more Vias of the printed circuit board.

19 Claims, 10 Drawing Sheets

(56) References Cited

U.S. PATENT DOCUMENTS

| | | | |
|---|---|---|---|
| 4,375,637 | A | 3/1983 | Desjardins |
| 4,389,577 | A | 6/1983 | Anderson et al. |
| 4,412,284 | A | 10/1983 | Kerforne et al. |
| 4,523,295 | A | 6/1985 | Zato |
| 4,531,214 | A | 7/1985 | Torres et al. |
| 4,577,977 | A | 3/1986 | Pejsa |
| 4,644,320 | A | 2/1987 | Carr et al. |
| 4,918,615 | A | 4/1990 | Suzuki et al. |
| 4,924,404 | A | 5/1990 | Reinke, Jr. |
| 4,939,922 | A | 7/1990 | Smalley et al. |
| 5,012,406 | A | 4/1991 | Martin |
| 5,315,533 | A | 5/1994 | Stich et al. |
| 5,493,191 | A | 2/1996 | Phoy et al. |
| 5,519,295 | A | 5/1996 | Jatnieks |
| 5,553,094 | A | 9/1996 | Johnson et al. |
| 5,566,084 | A | 10/1996 | Cmar |
| 5,598,349 | A | 1/1997 | Elliason et al. |
| 5,621,256 | A | 4/1997 | Crane et al. |
| 5,727,579 | A | 3/1998 | Chardack |
| 5,745,126 | A | 4/1998 | Jain et al. |
| 5,751,916 | A | 5/1998 | Kon et al. |
| 5,777,598 | A | 7/1998 | Gowda et al. |
| 5,793,125 | A | 8/1998 | Tarng |
| 5,973,662 | A | 10/1999 | Singers et al. |
| 5,990,932 | A | 11/1999 | Bee et al. |
| 6,065,842 | A | 5/2000 | Fink |
| 6,078,970 | A | 6/2000 | Nordstrom et al. |
| 6,139,177 | A | 10/2000 | Venkatraman et al. |
| 6,144,993 | A | 11/2000 | Fukunaga et al. |
| 6,157,943 | A | 12/2000 | Meyer |
| 6,218,995 | B1 | 4/2001 | Higgins et al. |
| 6,222,714 | B1 | 4/2001 | Hoffman |
| 6,229,429 | B1 | 5/2001 | Horon |
| 6,238,337 | B1 | 5/2001 | Kambhatla et al. |
| 6,249,100 | B1 | 6/2001 | Lange |
| 6,262,496 | B1 | 7/2001 | Lamar et al. |
| 6,262,685 | B1 | 7/2001 | Welch et al. |
| 6,334,211 | B1 | 12/2001 | Kojima et al. |
| 6,353,853 | B1 | 3/2002 | Gravlin |
| 6,369,695 | B2 | 4/2002 | Horon |
| 6,375,038 | B1 | 4/2002 | Daansen et al. |
| 6,429,868 | B1 | 8/2002 | Dehner et al. |
| 6,473,084 | B1 | 10/2002 | Phillips et al. |
| 6,487,457 | B1 | 11/2002 | Hull et al. |
| 6,532,195 | B1 | 3/2003 | Head |
| 6,552,525 | B2 | 4/2003 | Bessler |
| 6,574,581 | B1 | 6/2003 | Bohrer et al. |
| 6,580,950 | B1 | 6/2003 | Johnson et al. |
| 6,598,056 | B1 | 7/2003 | Hull et al. |
| 6,619,555 | B2 | 9/2003 | Rosen |
| 6,704,012 | B1 | 3/2004 | Lefave |
| 6,720,874 | B2 | 4/2004 | Fufidio et al. |
| 6,741,915 | B2 | 5/2004 | Poth |
| 6,796,896 | B2 | 9/2004 | Laiti |
| 6,801,199 | B1 | 10/2004 | Wallman |
| 6,816,878 | B1 | 11/2004 | Zimmers et al. |
| 6,838,978 | B2 | 1/2005 | Aizu et al. |
| 6,876,951 | B2 | 4/2005 | Skidmore et al. |
| 6,882,278 | B2 | 4/2005 | Winings et al. |
| 6,885,185 | B1 | 4/2005 | Makinson et al. |
| 6,904,385 | B1 | 6/2005 | Budike, Jr. |
| 6,907,387 | B1 | 6/2005 | Reardon |
| 6,911,177 | B2 | 6/2005 | Deal |
| 6,931,445 | B2 | 8/2005 | Davis |
| 6,975,958 | B2 | 12/2005 | Bohrer et al. |
| 6,993,403 | B1 | 1/2006 | Dadebo et al. |
| 6,993,417 | B2 | 1/2006 | Osann, Jr. |
| 7,023,440 | B1 | 4/2006 | Havekost et al. |
| 7,031,880 | B1 | 4/2006 | Seem et al. |
| 7,058,524 | B2 | 6/2006 | Hayes et al. |
| 7,062,722 | B1 | 6/2006 | Carlin et al. |
| 7,110,843 | B2 | 9/2006 | Pagnano et al. |
| 7,129,900 | B2 | 10/2006 | De Angelis |
| 7,139,685 | B2 | 11/2006 | Bascle et al. |
| 7,164,972 | B2 | 1/2007 | Imhof et al. |
| 7,183,899 | B2 | 2/2007 | Behnke |
| 7,196,673 | B2 | 3/2007 | Savage et al. |
| 7,200,639 | B1 | 4/2007 | Yoshida |
| 7,222,111 | B1 | 5/2007 | Budike, Jr. |
| 7,222,800 | B2 | 5/2007 | Wruck |
| 7,257,397 | B2 | 8/2007 | Shamoon et al. |
| 7,280,030 | B1 | 10/2007 | Monaco |
| 7,292,908 | B2 | 11/2007 | Borne et al. |
| 7,295,116 | B2 | 11/2007 | Kumar et al. |
| 7,302,313 | B2 | 11/2007 | Sharp et al. |
| 7,308,323 | B2 | 12/2007 | Kruk et al. |
| 7,308,388 | B2 | 12/2007 | Beverina et al. |
| 7,313,447 | B2 | 12/2007 | Hsiung et al. |
| 7,317,404 | B2 | 1/2008 | Cumeralto et al. |
| 7,346,433 | B2 | 3/2008 | Budike, Jr. |
| 7,346,467 | B2 | 3/2008 | Bohrer et al. |
| 7,356,548 | B1 | 4/2008 | Culp et al. |
| 7,372,373 | B2 | 5/2008 | Borisov et al. |
| 7,379,782 | B1 | 5/2008 | Cocco |
| 7,379,997 | B2 | 5/2008 | Ehlers et al. |
| 7,383,148 | B2 | 6/2008 | Ahmed |
| 7,392,115 | B2 | 6/2008 | Schindler |
| 7,425,924 | B2 | 9/2008 | Chung et al. |
| 7,434,742 | B2 | 10/2008 | Mueller et al. |
| 7,447,333 | B1 | 11/2008 | Masticola et al. |
| 7,453,373 | B2 | 11/2008 | Cumeralto et al. |
| 7,466,224 | B2 | 12/2008 | Ward et al. |
| 7,496,472 | B2 | 2/2009 | Seem |
| 7,512,450 | B2 | 3/2009 | Ahmed |
| 7,516,490 | B2 | 4/2009 | Riordan et al. |
| 7,527,519 | B2 | 5/2009 | Van Dyne |
| 7,548,833 | B2 | 6/2009 | Ahmed |
| 7,551,092 | B1 | 6/2009 | Henry |
| 7,557,729 | B2 | 7/2009 | Hubbard et al. |
| 7,567,844 | B2 | 7/2009 | Thomas et al. |
| 7,596,473 | B2 | 9/2009 | Hansen et al. |
| 7,603,222 | B2 | 10/2009 | Wiseman et al. |
| 7,610,910 | B2 | 11/2009 | Ahmed |
| 7,626,507 | B2 | 12/2009 | Lacasse |
| 7,664,574 | B2 | 2/2010 | Imhof et al. |
| 7,671,814 | B2 | 3/2010 | Savage et al. |
| 7,682,464 | B2 | 3/2010 | Glenn et al. |
| 7,702,421 | B2 | 4/2010 | Sullivan et al. |
| 7,729,882 | B2 | 6/2010 | Seem |
| 7,755,494 | B2 | 7/2010 | Melker et al. |
| 7,761,310 | B2 | 7/2010 | Rodgers |
| 7,774,227 | B2 | 8/2010 | Srivastava |
| 7,797,188 | B2 | 9/2010 | Srivastava |
| 7,819,136 | B1 | 10/2010 | Eddy |
| 7,822,806 | B2 | 10/2010 | Frank et al. |
| 7,856,370 | B2 | 12/2010 | Katta et al. |
| 7,973,673 | B2 | 7/2011 | Payne et al. |
| 7,978,083 | B2 | 7/2011 | Melker et al. |
| 7,984,384 | B2 | 7/2011 | Chaudhri et al. |
| 7,986,323 | B2 | 7/2011 | Kobayashi et al. |
| 7,994,990 | B2 | 8/2011 | Stoufer et al. |
| 7,994,994 | B2 | 8/2011 | Savage et al. |
| 8,024,666 | B2 | 9/2011 | Thompson |
| 8,084,982 | B2 | 12/2011 | Grabinger et al. |
| 8,086,047 | B2 | 12/2011 | Penke et al. |
| 8,099,178 | B2 | 1/2012 | Mairs et al. |
| 8,129,859 | B2 | 3/2012 | Pien |
| 8,151,280 | B2 | 4/2012 | Sather et al. |
| 8,176,095 | B2 | 5/2012 | Murray et al. |
| 8,218,871 | B2 | 7/2012 | Angell et al. |
| 8,219,660 | B2 | 7/2012 | Mccoy et al. |
| 8,271,941 | B2 | 9/2012 | Zhang et al. |
| 8,284,107 | B2 | 10/2012 | Borisov et al. |
| 8,294,585 | B2 | 10/2012 | Barnhill |
| 8,299,975 | B2 | 10/2012 | Savage et al. |
| 8,302,020 | B2 | 10/2012 | Louch et al. |
| 8,320,634 | B2 | 11/2012 | Deutsch |
| 8,334,422 | B2 | 12/2012 | Gutsol et al. |
| 8,344,893 | B1 | 1/2013 | Drammeh |
| 8,375,118 | B2 | 2/2013 | Hao et al. |
| 8,439,692 | B1 | 5/2013 | Oddsen et al. |
| 8,462,060 | B2 | 6/2013 | Savage et al. |
| 8,467,734 | B2 | 6/2013 | Schubert |
| 8,473,080 | B2 | 6/2013 | Seem et al. |

(56) References Cited

U.S. PATENT DOCUMENTS 8,476,590 B2 7/2013 Stratmann et al.
8,516,016 B2 8/2013 Park et al.
8,536,998 B1 9/2013 Siu et al.
8,547,283 B2 * 10/2013 Wong .................. H01Q 9/0421 343/702
8,558,660 B2 10/2013 Nix et al.
8,639,527 B2 1/2014 Rensvold et al.
8,698,637 B2 4/2014 Raichman
8,774,707 B2 7/2014 Flammer, III et al.
8,816,860 B2 8/2014 Ophardt et al.
8,838,413 B2 9/2014 Genta
8,869,027 B2 10/2014 Louch et al.
8,904,497 B2 12/2014 Hsieh
8,931,337 B2 1/2015 Renoud et al.
8,936,944 B2 1/2015 Peltz et al.
8,947,437 B2 2/2015 Garr et al.
8,950,019 B2 2/2015 Loberger et al.
8,957,551 B1 2/2015 Alberth et al.
8,996,188 B2 3/2015 Frader-Thompson et al.
9,000,926 B2 4/2015 Hollock et al.
9,002,532 B2 4/2015 Asmus
9,013,283 B1 4/2015 Tackaberry
9,030,325 B2 5/2015 Taneff
9,098,738 B2 8/2015 Bilet et al.
9,105,071 B2 8/2015 Fletcher et al.
9,172,245 B1 10/2015 Lentine et al.
9,175,356 B2 11/2015 Peltz et al.
9,235,657 B1 1/2016 Wenzel et al.
9,240,111 B2 1/2016 Scott et al.
9,256,702 B2 2/2016 Elbsat et al.
9,280,884 B1 3/2016 Schultz et al.
9,292,972 B2 3/2016 Hailemariam et al.
9,311,807 B2 4/2016 Schultz et al.
9,320,662 B2 4/2016 Hayes et al.
9,322,566 B2 4/2016 Wenzel et al.
9,355,069 B2 5/2016 Elbsat et al.
9,370,600 B1 6/2016 Dupuis et al.
9,372,482 B2 6/2016 Rikkola et al.
9,373,242 B1 6/2016 Conrad et al.
9,396,638 B2 7/2016 Wildman et al.
9,406,212 B2 8/2016 De et al.
9,418,535 B1 8/2016 Felch et al.
9,418,536 B1 8/2016 Felch et al.
9,436,179 B1 9/2016 Turney et al.
9,437,993 B2 9/2016 Stephens
9,441,547 B2 9/2016 Cai et al.
9,449,219 B2 9/2016 Bilet et al.
9,477,543 B2 10/2016 Henley et al.
9,497,832 B2 11/2016 Verberkt et al.
9,513,364 B2 12/2016 Hall et al.
9,526,380 B2 12/2016 Hamilton et al.
9,526,806 B2 12/2016 Park et al.
9,536,415 B2 1/2017 De et al.
9,558,648 B2 1/2017 Douglas
9,568,204 B2 2/2017 Asmus et al.
9,581,985 B2 2/2017 Walser et al.
9,591,267 B2 3/2017 Lipton et al.
9,606,520 B2 3/2017 Noboa et al.
9,612,601 B2 4/2017 Beyhaghi et al.
9,613,518 B2 4/2017 Dunn et al.
9,618,224 B2 4/2017 Emmons et al.
9,640,059 B2 5/2017 Hyland
9,672,360 B2 6/2017 Barkan
9,696,054 B2 7/2017 Asmus
9,699,871 B2 7/2017 Karc et al.
9,710,700 B2 7/2017 Bilet et al.
9,715,242 B2 7/2017 Pillai et al.
9,721,452 B2 8/2017 Felch et al.
9,729,945 B2 8/2017 Schultz et al.
9,766,638 B2 9/2017 Georgin
9,778,639 B2 10/2017 Boettcher et al.
9,784,464 B2 10/2017 Yamamoto et al.
9,798,336 B2 10/2017 Przybylski
9,826,604 B2 11/2017 Karc et al.
9,843,743 B2 12/2017 Lewis et al.
9,852,481 B1 12/2017 Turney et al.
9,856,634 B2 1/2018 Rodenbeck et al.
9,872,088 B2 1/2018 Fadell et al.
9,875,639 B2 1/2018 Bone et al.
9,911,312 B2 3/2018 Wildman et al.
9,940,819 B2 4/2018 Ferniany
9,956,306 B2 5/2018 Brais et al.
9,982,903 B1 5/2018 Ridder et al.
9,986,175 B2 5/2018 Frank et al.
10,007,259 B2 6/2018 Turney et al.
10,031,494 B2 7/2018 Holaso
10,044,101 B1 8/2018 Nair et al.
10,055,114 B2 8/2018 Shah et al.
10,087,608 B2 10/2018 Dobizl et al.
10,101,730 B2 10/2018 Wenzel et al.
10,101,731 B2 10/2018 Asmus et al.
10,112,727 B1 10/2018 Cutler
10,175,681 B2 1/2019 Wenzel et al.
10,222,083 B2 3/2019 Drees et al.
10,222,767 B2 3/2019 Holaso et al.
10,223,894 B2 3/2019 Raichman
10,228,837 B2 3/2019 Hua et al.
10,235,865 B2 3/2019 Thyroff
10,251,610 B2 4/2019 Parthasarathy et al.
10,282,796 B2 5/2019 Elbsat et al.
10,288,306 B2 5/2019 Ridder et al.
10,303,843 B2 5/2019 Bitran et al.
10,317,864 B2 6/2019 Boettcher et al.
10,332,043 B2 6/2019 Nair et al.
10,332,382 B2 6/2019 Thyroff
10,359,748 B2 7/2019 Elbsat et al.
10,386,820 B2 8/2019 Wenzel et al.
10,402,767 B2 9/2019 Noboa et al.
10,514,178 B2 12/2019 Willmott et al.
10,514,817 B2 12/2019 Hua et al.
10,520,210 B2 12/2019 Park et al.
10,544,955 B2 1/2020 Przybylski
10,558,178 B2 2/2020 Willmott et al.
10,559,180 B2 2/2020 Pourmohammad et al.
10,559,181 B2 2/2020 Pourmohammad et al.
10,565,844 B2 2/2020 Pourmohammad et al.
10,600,263 B2 3/2020 Park et al.
10,602,474 B2 3/2020 Goldstein
10,605,477 B2 3/2020 Ridder
10,607,147 B2 3/2020 Raykov et al.
10,615,635 B1 4/2020 Desantis et al.
10,619,882 B2 4/2020 Chatterjee et al.
10,627,124 B2 4/2020 Walser et al.
10,673,380 B2 6/2020 Wenzel et al.
10,678,227 B2 6/2020 Przybylski et al.
10,694,610 B2 6/2020 Karc et al.
10,706,375 B2 7/2020 Wenzel et al.
10,726,711 B2 7/2020 Subramanian et al.
10,732,584 B2 8/2020 Elbsat et al.
10,767,885 B2 9/2020 Przybylski et al.
10,775,988 B2 9/2020 Narain et al.
10,796,554 B2 10/2020 Vincent et al.
10,809,682 B2 10/2020 Patil et al.
10,809,705 B2 10/2020 Przybylski
10,824,125 B2 11/2020 Elbsat et al.
10,854,194 B2 12/2020 Park et al.
10,871,298 B2 12/2020 Ridder et al.
10,876,754 B2 12/2020 Wenzel et al.
10,890,904 B2 1/2021 Turney et al.
10,900,686 B2 1/2021 Willmott et al.
10,901,446 B2 1/2021 Nesler et al.
10,909,240 B2 2/2021 Eltoft
10,909,642 B2 2/2021 Elbsat et al.
10,915,094 B2 2/2021 Wenzel et al.
10,917,740 B1 2/2021 Scott et al.
10,921,972 B2 2/2021 Park et al.
10,921,973 B2 2/2021 Park et al.
10,923,911 B2 2/2021 Raneri et al.
10,928,790 B2 2/2021 Mueller et al.
10,948,884 B2 3/2021 Beaty et al.
10,949,777 B2 3/2021 Elbsat et al.
10,955,800 B2 3/2021 Burroughs et al.
10,956,842 B2 3/2021 Wenzel et al.
10,962,945 B2 3/2021 Park et al.

(56) References Cited

U.S. PATENT DOCUMENTS 10,969,135 B2 4/2021 Willmott et al.
11,002,457 B2 5/2021 Turney et al.
11,009,252 B2 5/2021 Turney et al.
11,010,846 B2 5/2021 Elbsat et al.
11,016,648 B2 5/2021 Fala et al.
11,016,998 B2 5/2021 Park et al.
11,022,947 B2 6/2021 Elbsat et al.
11,024,292 B2 6/2021 Park et al.
11,036,249 B2 6/2021 Elbsat
11,038,709 B2 6/2021 Park et al.
11,042,139 B2 6/2021 Deshpande et al.
11,042,924 B2 6/2021 Asmus et al.
11,061,424 B2 7/2021 Elbsat et al.
11,068,821 B2 7/2021 Wenzel et al.
11,070,389 B2 7/2021 Schuster et al.
11,073,976 B2 7/2021 Park et al.
11,080,289 B2 8/2021 Park et al.
11,080,426 B2 8/2021 Park et al.
11,083,072 B2 8/2021 Karc et al.
11,086,276 B2 8/2021 Wenzel et al.
11,094,186 B2 8/2021 Razak
11,108,587 B2 8/2021 Park et al.
11,113,295 B2 9/2021 Park et al.
11,119,458 B2 9/2021 Asp et al.
11,120,012 B2 9/2021 Park et al.
11,131,473 B2 9/2021 Risbeck et al.
11,150,617 B2 10/2021 Ploegert et al.
11,151,983 B2 10/2021 Park et al.
11,156,996 B2 10/2021 Schuster et al.
11,158,306 B2 10/2021 Park et al.
11,182,047 B2 11/2021 Nayak et al.
11,195,401 B2 12/2021 Pourmohammad
11,201,395 B2 12/2021 Carpenter et al.
11,217,087 B2 1/2022 Pelski
11,226,126 B2 1/2022 Przybylski et al.
11,243,523 B2 2/2022 Llopis et al.
11,268,715 B2 3/2022 Park et al.
11,268,996 B2 3/2022 Vitullo et al.
11,269,505 B2 3/2022 Fala et al.
11,272,011 B1 3/2022 Laughton et al.
11,272,316 B2 3/2022 Scott et al.
11,275,348 B2 3/2022 Park et al.
11,275,363 B2 3/2022 Przybylski et al.
11,281,169 B2 3/2022 Chatterjee et al.
11,288,754 B2 3/2022 Elbsat et al.
11,289,853 B2 3/2022 Stephens
11,314,726 B2 4/2022 Park et al.
11,314,788 B2 4/2022 Park et al.
11,334,044 B2 5/2022 Goyal
11,353,834 B2 6/2022 Mueller et al.
11,356,292 B2 6/2022 Ploegert et al.
11,360,451 B2 6/2022 Pancholi et al.
11,361,123 B2 6/2022 Ploegert et al.
11,450,969 B1 * 9/2022 Hussain ................. H01Q 5/321
11,569,621 B2 1/2023 Turner et al.
11,588,245 B2 2/2023 Wei
11,614,721 B2 3/2023 Funes
11,888,093 B2 1/2024 Zhang et al.
11,946,960 B2 4/2024 Della et al.
12,072,357 B1 8/2024 Chaboud et al.
2002/0111698 A1 8/2002 Graziano et al.
2002/0130868 A1 9/2002 Smith
2002/0175815 A1 11/2002 Baldwin
2003/0028269 A1 2/2003 Spriggs et al.
2003/0030637 A1 2/2003 Grinstein et al.
2003/0046862 A1 3/2003 Wolf et al.
2003/0071814 A1 4/2003 Jou et al.
2003/0078677 A1 4/2003 Hull et al.
2003/0083957 A1 5/2003 Olefson
2003/0103075 A1 6/2003 Rosselot
2003/0171851 A1 9/2003 Brickfield et al.
2003/0179149 A1 9/2003 Savage et al.
2003/0214400 A1 11/2003 Mizutani et al.
2003/0233432 A1 12/2003 Davis et al.
2004/0001009 A1 1/2004 Winings et al.
2004/0030531 A1 2/2004 Miller et al.
2004/0041734 A1 3/2004 Shiotsu et al.
2004/0064260 A1 4/2004 Padmanabhan et al.
2004/0143474 A1 7/2004 Haeberle et al.
2004/0153437 A1 8/2004 Buchan
2004/0168115 A1 8/2004 Bauernschmidt et al.
2004/0196188 A1 10/2004 Yeh
2004/0233192 A1 11/2004 Hopper
2004/0260411 A1 12/2004 Cannon
2005/0007279 A1 * 1/2005 Chang .................... H01Q 5/357 343/702
2005/0010460 A1 1/2005 Mizoguchi et al.
2005/0060107 A1 3/2005 Rodenberg et al.
2005/0083235 A1 4/2005 Savage et al.
2005/0110692 A1 * 5/2005 Andersson ........... H01Q 19/005 343/702
2005/0119767 A1 6/2005 Kiwimagi et al.
2005/0143863 A1 6/2005 Ruane et al.
2005/0190074 A1 9/2005 Cumeralto et al.
2005/0200554 A1 9/2005 Chau
2005/0267900 A1 12/2005 Ahmed et al.
2006/0004841 A1 1/2006 Heikkonen et al.
2006/0009862 A1 1/2006 Imhof et al.
2006/0016201 A1 1/2006 Kopel
2006/0017547 A1 1/2006 Buckingham et al.
2006/0020177 A1 1/2006 Seo et al.
2006/0028471 A1 2/2006 Kincaid et al.
2006/0029256 A1 2/2006 Miyoshi et al.
2006/0055610 A1 * 3/2006 Borisov ................... H01Q 1/52 343/719
2006/0058900 A1 3/2006 Johanson et al.
2006/0067545 A1 3/2006 Lewis et al.
2006/0067546 A1 3/2006 Lewis et al.
2006/0077255 A1 4/2006 Cheng
2006/0114121 A1 6/2006 Cumeralto et al.
2006/0161373 A1 7/2006 Mangrulkar et al.
2006/0184326 A1 8/2006 Mcnally et al.
2006/0231568 A1 10/2006 Lynn et al.
2006/0265664 A1 11/2006 Simons et al.
2006/0279630 A1 12/2006 Aggarwal et al.
2006/0284784 A1 12/2006 Smith et al.
2007/0016955 A1 1/2007 Goldberg et al.
2007/0055757 A1 3/2007 Mairs et al.
2007/0055760 A1 3/2007 Mccoy et al.
2007/0061046 A1 3/2007 Mairs et al.
2007/0063915 A1 3/2007 Savage et al.
2007/0067062 A1 3/2007 Mairs et al.
2007/0088534 A1 4/2007 Macarthur et al.
2007/0090951 A1 4/2007 Chan et al.
2007/0091091 A1 4/2007 Gardiner et al.
2007/0101433 A1 5/2007 Louch et al.
2007/0114295 A1 5/2007 Jenkins
2007/0118270 A1 5/2007 Wiseman et al.
2007/0120652 A1 5/2007 Behnke
2007/0121512 A1 5/2007 Schibli et al.
2007/0139208 A1 6/2007 Kates
2007/0188388 A1 * 8/2007 Feng .................... H01Q 9/0421 343/702
2007/0216682 A1 9/2007 Navratil et al.
2007/0219645 A1 9/2007 Thomas et al.
2007/0229366 A1 * 10/2007 Kim ........................ H01Q 9/42 343/846
2007/0239484 A1 10/2007 Arond et al.
2007/0268122 A1 11/2007 Kow et al.
2007/0271006 A1 11/2007 Golden et al.
2008/0001763 A1 1/2008 Raja et al.
2008/0009177 A1 1/2008 Singer et al.
2008/0011864 A1 1/2008 Tessier et al.
2008/0027885 A1 1/2008 Van et al.
2008/0036593 A1 2/2008 Rose-Pehrsson et al.
2008/0062167 A1 3/2008 Boggs et al.
2008/0099045 A1 5/2008 Glenn et al.
2008/0103798 A1 5/2008 Domenikos et al.
2008/0120396 A1 5/2008 Jayaram et al.
2008/0129536 A1 6/2008 Randall et al.
2008/0144885 A1 6/2008 Zucherman et al.
2008/0173629 A1 7/2008 Deibel et al.
2008/0180330 A1 7/2008 Wei-Shan et al.
2008/0183424 A1 7/2008 Seem

(56) References Cited

U.S. PATENT DOCUMENTS

2008/0194009 A1 8/2008 Marentis
2008/0198231 A1 8/2008 Ozdemir et al.
2008/0209342 A1 8/2008 Taylor et al.
2008/0222565 A1 9/2008 Taylor et al.
2008/0224862 A1 9/2008 Cirker
2008/0228325 A1 9/2008 Schindler
2008/0238406 A1 10/2008 Banhegyesi
2008/0238711 A1 10/2008 Payne et al.
2008/0242945 A1 10/2008 Gugliotti et al.
2008/0250800 A1 10/2008 Wetzel
2008/0279420 A1 11/2008 Masticola et al.
2008/0280275 A1 11/2008 Collopy
2008/0303658 A1 12/2008 Melker et al.
2008/0306985 A1 12/2008 Murray et al.
2008/0316087 A1 12/2008 Stoufer et al.
2008/0320552 A1 12/2008 Kumar et al.
2009/0001180 A1 1/2009 Siddaramanna et al.
2009/0001181 A1 1/2009 Siddaramanna et al.
2009/0001182 A1 1/2009 Siddaramanna et al.
2009/0015356 A1 1/2009 Chen
2009/0024944 A1 1/2009 Louch et al.
2009/0045804 A1 2/2009 Durling et al.
2009/0065596 A1 3/2009 Seem et al.
2009/0083120 A1 3/2009 Strichman et al.
2009/0096791 A1 4/2009 Abshear et al.
2009/0125337 A1 5/2009 Abri
2009/0125825 A1 5/2009 Rye et al.
2009/0144023 A1 6/2009 Seem
2009/0157744 A1 6/2009 Mcconnell
2009/0160673 A1 6/2009 Cirker
2009/0195349 A1 8/2009 Frader-Thompson et al.
2009/0224987 A1* 9/2009 Maddaleno ............ H01Q 13/16
343/702
2009/0312969 A1 12/2009 Sundaresh et al.
2009/0315409 A1 12/2009 Wheeler et al.
2009/0322782 A1 12/2009 Kimchi et al.
2010/0038218 A1 2/2010 Fisher et al.
2010/0048167 A1 2/2010 Chow et al.
2010/0058248 A1 3/2010 Park
2010/0064001 A1 3/2010 Daily
2010/0070089 A1 3/2010 Harrod et al.
2010/0073162 A1 3/2010 Johnson et al.
2010/0097287 A1 4/2010 Pakosz et al.
2010/0110617 A1 5/2010 Savage et al.
2010/0123421 A1 5/2010 Grabinger et al.
2010/0123560 A1 5/2010 Nix et al.
2010/0134296 A1 6/2010 Hwang
2010/0149053 A1 6/2010 Nakano et al.
2010/0156628 A1 6/2010 Ainsbury et al.
2010/0156630 A1 6/2010 Ainsbury
2010/0188228 A1 7/2010 Hyland
2010/0201514 A1 8/2010 Barna et al.
2010/0223198 A1 9/2010 Noureldin et al.
2010/0249955 A1 9/2010 Sitton
2010/0253538 A1 10/2010 Smith
2010/0280674 A1 11/2010 Jalili
2010/0286937 A1 11/2010 Hedley et al.
2010/0318200 A1 12/2010 Foslien et al.
2010/0324962 A1 12/2010 Nesler et al.
2011/0010654 A1 1/2011 Raymond et al.
2011/0038104 A1 2/2011 Payne et al.
2011/0057799 A1 3/2011 Taneff
2011/0063172 A1 3/2011 Podduturi
2011/0076131 A1 3/2011 Stabley et al.
2011/0077779 A1 3/2011 Fuller et al.
2011/0083094 A1 4/2011 Laycock et al.
2011/0087988 A1 4/2011 Ray et al.
2011/0095608 A1 4/2011 Jonsson et al.
2011/0095949 A1 4/2011 Wong et al.
2011/0112854 A1 5/2011 Koch et al.
2011/0122027 A1 5/2011 Wong et al.
2011/0126111 A1 5/2011 Gill et al.
2011/0149544 A1 6/2011 Khan
2011/0154426 A1 6/2011 Doser et al.
2011/0161124 A1 6/2011 Lappinga et al.
2011/0163925 A1 7/2011 Savage et al.
2011/0169646 A1 7/2011 Raichman
2011/0184563 A1 7/2011 Foslien et al.
2011/0196634 A1 8/2011 Kemp et al.
2011/0202467 A1 8/2011 Hilber et al.
2011/0227806 A1 9/2011 Wong et al.
2011/0242863 A1 10/2011 Park et al.
2011/0260938 A1 10/2011 Xie
2011/0267237 A1 11/2011 Wong et al.
2011/0273298 A1 11/2011 Snodgrass et al.
2011/0291841 A1 12/2011 Hollock et al.
2011/0298301 A1 12/2011 Wong et al.
2011/0302433 A1 12/2011 Liu
2011/0316703 A1 12/2011 Butler et al.
2011/0320054 A1 12/2011 Brzezowski
2012/0001815 A1 1/2012 Wong et al.
2012/0015665 A1 1/2012 Farley et al.
2012/0022700 A1 1/2012 Drees et al.
2012/0039503 A1 2/2012 Chen et al.
2012/0062382 A1 3/2012 Taneff
2012/0075464 A1 3/2012 Derenne et al.
2012/0098710 A1 4/2012 Seal et al.
2012/0109988 A1 5/2012 Li et al.
2012/0112883 A1 5/2012 Wallace et al.
2012/0131217 A1 5/2012 Delorme et al.
2012/0154222 A1 6/2012 Oh et al.
2012/0158185 A1 6/2012 El-Mankabady et al.
2012/0216243 A1 8/2012 Gill et al.
2012/0224057 A1 9/2012 Gill et al.
2012/0259466 A1 10/2012 Ray et al.
2012/0262472 A1 10/2012 Garr et al.
2012/0272146 A1 10/2012 D'Souza et al.
2012/0290261 A1 11/2012 Genta
2012/0291068 A1 11/2012 Khushoo et al.
2012/0303652 A1 11/2012 Tseng
2012/0310418 A1 12/2012 Harrod et al.
2013/0050033 A1 2/2013 Savage et al.
2013/0055132 A1 2/2013 Foslien
2013/0060794 A1 3/2013 Puttabasappa et al.
2013/0082842 A1 4/2013 Balazs et al.
2013/0085620 A1 4/2013 Lu et al.
2013/0086152 A1 4/2013 Hersche et al.
2013/0091631 A1 4/2013 Hayes et al.
2013/0091945 A1 4/2013 Renoud et al.
2013/0099938 A1 4/2013 Borisov et al.
2013/0110295 A1 5/2013 Zheng et al.
2013/0135468 A1 5/2013 Kim et al.
2013/0148248 A1 6/2013 Zhou
2013/0157559 A1 6/2013 Flammer, III et al.
2013/0164971 A1 6/2013 Chung et al.
2013/0169681 A1 7/2013 Rasane et al.
2013/0178996 A1 7/2013 Li et al.
2013/0184880 A1 7/2013 Mcmahon
2013/0187775 A1 7/2013 Marsden et al.
2013/0204570 A1 8/2013 Mendelson et al.
2013/0229276 A1 9/2013 Hunter
2013/0234534 A1 9/2013 Lin
2013/0268293 A1 10/2013 Knudson et al.
2013/0289774 A1 10/2013 Day et al.
2014/0032157 A1 1/2014 Khiani
2014/0035368 A1 2/2014 Adams
2014/0040998 A1 2/2014 Yi-Chang
2014/0046490 A1 2/2014 Foslien et al.
2014/0046722 A1 2/2014 Rosenbloom et al.
2014/0058539 A1 2/2014 Park
2014/0077821 A1 3/2014 Reed et al.
2014/0088779 A1 3/2014 Chen et al.
2014/0167917 A2 6/2014 Wallace et al.
2014/0180486 A1 6/2014 Newman et al.
2014/0184453 A1 7/2014 Chen et al.
2014/0207291 A1 7/2014 Golden et al.
2014/0265881 A1 9/2014 Karc et al.
2014/0274181 A1 9/2014 Lovegren et al.
2014/0277764 A1 9/2014 Burt
2014/0292518 A1 10/2014 Wildman et al.
2014/0307076 A1 10/2014 Deutsch
2014/0309757 A1 10/2014 Le et al.
2014/0312696 A1 10/2014 Tousignant et al.
2014/0316582 A1 10/2014 Berg-Sonne et al.

(56) References Cited

U.S. PATENT DOCUMENTS

2014/0320289 A1 10/2014 Raichman
2014/0342724 A1 11/2014 Hill et al.
2015/0007713 A1 1/2015 Aki
2015/0025329 A1 1/2015 Amarasingham et al.
2015/0032264 A1 1/2015 Emmons et al.
2015/0035712 A1 2/2015 Wong et al.
2015/0056909 A1 2/2015 Chien
2015/0070174 A1 3/2015 Douglas
2015/0077258 A1 3/2015 Nelson et al.
2015/0113462 A1 4/2015 Chen et al.
2015/0123874 A1 5/2015 Chan et al.
2015/0153918 A1 6/2015 Chen et al.
2015/0161874 A1 6/2015 Thyroff et al.
2015/0167995 A1 6/2015 Fadell et al.
2015/0168949 A1 6/2015 Hua et al.
2015/0194043 A1 7/2015 Dunn et al.
2015/0198707 A1 7/2015 Al-Alusi
2015/0212717 A1 7/2015 Nair et al.
2015/0213222 A1 7/2015 Amarasingham et al.
2015/0213379 A1 7/2015 Nair et al.
2015/0216369 A1 8/2015 Hamilton et al.
2015/0236417 A1 8/2015 Iellci
2015/0249337 A1 9/2015 Raneri et al.
2015/0253748 A1 9/2015 Brun et al.
2015/0262468 A1 9/2015 Yang
2015/0281287 A1 10/2015 Gill et al.
2015/0289125 A1 10/2015 Van et al.
2015/0323928 A1 11/2015 Yim et al.
2015/0358874 A1 12/2015 Ahn et al.
2015/0380932 A1 12/2015 Karle
2016/0061476 A1 3/2016 Schultz et al.
2016/0061477 A1 3/2016 Schultz et al.
2016/0061794 A1 3/2016 Schultz et al.
2016/0061795 A1 3/2016 Schultz et al.
2016/0063833 A1 3/2016 Schultz et al.
2016/0066067 A1 3/2016 Schultz et al.
2016/0116181 A1 4/2016 Aultman et al.
2016/0139067 A1 5/2016 Grace
2016/0195435 A1 7/2016 Krueger et al.
2016/0197467 A1 7/2016 Stepp
2016/0223215 A1 8/2016 Buda et al.
2016/0253897 A1 9/2016 Wildman et al.
2016/0255516 A1 9/2016 Hill et al.
2016/0266183 A1 9/2016 Park
2016/0268742 A1 9/2016 Seff et al.
2016/0294048 A1* 10/2016 Xu ...................... H01Q 1/2291
2016/0294062 A1 10/2016 Lo et al.
2016/0298864 A1 10/2016 Ekolind et al.
2016/0306934 A1 10/2016 Sperry et al.
2016/0314683 A1 10/2016 Felch et al.
2016/0328948 A1 11/2016 Ferniany
2016/0335731 A1 11/2016 Hall
2016/0367925 A1 12/2016 Blackley
2016/0380392 A1 12/2016 Justice et al.
2017/0024986 A1 1/2017 Austin
2017/0152862 A1 6/2017 Houst et al.
2017/0193792 A1 7/2017 Bermudez et al.
2017/0207542 A1 7/2017 Tseng et al.
2017/0256155 A1 9/2017 Sengstaken, Jr.
2017/0280949 A1 10/2017 Wildman et al.
2017/0293293 A1 10/2017 Brownie et al.
2017/0294106 A1 10/2017 Thyroff
2017/0310109 A1 10/2017 Bollinger et al.
2017/0365024 A1 12/2017 Koch et al.
2018/0006492 A1 1/2018 Kim et al.
2018/0016773 A1 1/2018 Chandler et al.
2018/0076527 A1* 3/2018 Chen ........................ H01Q 1/36
2018/0151054 A1 5/2018 Pi
2018/0193501 A1 7/2018 Ufkes
2018/0218591 A1 8/2018 Easter
2018/0226797 A1 8/2018 Galin et al.
2018/0259927 A1 9/2018 Przybylski et al.
2018/0293038 A1 10/2018 Meruva et al.
2018/0294570 A1* 10/2018 Stowell .................. H01Q 11/04
2018/0301014 A1 10/2018 Worral et al.
2018/0313695 A1 11/2018 Shim et al.
2018/0364778 A1 12/2018 Lee
2018/0365957 A1 12/2018 Wright et al.
2019/0051138 A1 2/2019 Easter
2019/0067883 A1 2/2019 Yilmaz et al.
2019/0139395 A1 5/2019 Rogachev et al.
2019/0157817 A1 5/2019 Codreanu
2019/0209719 A1 7/2019 Andersen et al.
2020/0009280 A1 1/2020 Kupa et al.
2020/0021019 A1* 1/2020 Rajagopalan ........ H01Q 1/2291
2020/0021021 A1 1/2020 Lin et al.
2020/0074836 A1 3/2020 Kolavennu et al.
2020/0076067 A1 3/2020 McCraven
2020/0090089 A1 3/2020 Aston et al.
2020/0136374 A1 4/2020 Hagerman
2020/0146557 A1 5/2020 Cheung et al.
2020/0168993 A1 5/2020 Wei
2020/0179544 A1 6/2020 Ufkes
2020/0200420 A1 6/2020 Nayak et al.
2020/0208862 A1 7/2020 Mikulica et al.
2020/0343675 A1 10/2020 Wolf et al.
2020/0359605 A1 11/2020 Maher et al.
2021/0010701 A1 1/2021 Nesler et al.
2021/0011443 A1 1/2021 Mcnamara et al.
2021/0011444 A1 1/2021 Risbeck et al.
2021/0018334 A1 1/2021 Liu et al.
2021/0018884 A1 1/2021 Kupa et al.
2021/0022194 A1 1/2021 Taylor et al.
2021/0046205 A1 2/2021 Copeland et al.
2021/0057205 A1 2/2021 Riepe et al.
2021/0081845 A1 3/2021 Choueiter et al.
2021/0157303 A1 5/2021 Doh et al.
2021/0173046 A1 6/2021 Regani et al.
2021/0184409 A1 6/2021 Li et al.
2021/0223769 A1 7/2021 Khalate et al.
2021/0345065 A1 11/2021 Fisher et al.
2021/0359413 A1 11/2021 Sarabandi et al.
2021/0364181 A1 11/2021 Risbeck et al.
2021/0373519 A1 12/2021 Risbeck et al.
2022/0011731 A1 1/2022 Risbeck et al.
2022/0104123 A1 3/2022 Heeger et al.
2022/0113045 A1 4/2022 Gamroth et al.
2022/0137580 A1 5/2022 Burroughs et al.
2022/0149571 A1 5/2022 Codreanu et al.
2022/0303167 A1 9/2022 Wang et al.
2022/0352670 A1 11/2022 East
2023/0039166 A1 2/2023 Chapel et al.
2023/0299506 A1 9/2023 Park et al.
2023/0318222 A1 10/2023 Ko
2023/0402842 A1 12/2023 Macfie et al.
2024/0063658 A1 2/2024 Williams et al.
2024/0146061 A1 5/2024 Das et al.
2024/0167720 A1 5/2024 Luebke
2024/0258693 A1 8/2024 Liu et al.
2024/0283152 A1 8/2024 Wei et al.
2024/0283288 A1 8/2024 Feixas
2024/0313408 A1* 9/2024 Hussain ................... H01Q 5/35

FOREIGN PATENT DOCUMENTS

CA 2821190 A1 1/2014
CN 2906952 Y 5/2007
CN 201927858 U 8/2011
CN 201985387 U 9/2011
CN 102891410 A 1/2013
CN 103110410 A 5/2013
CN 103197138 A 7/2013
CN 103259136 A 8/2013
CN 103401103 A 11/2013
CN 203398457 U 1/2014
CN 203707489 U 7/2014
CN 103970977 A 8/2014
CN 104280243 A 1/2015
CN 104601682 A 5/2015
CN 105116848 A 12/2015
CN 105186227 A 12/2015
CN 105527850 A 4/2016
CN 106299896 A 1/2017
CN 106450871 A 2/2017

(56) References Cited

FOREIGN PATENT DOCUMENTS

| | | | | | |
|---|---|---|---|---|---|
| CN | 107168087 | A | | 9/2017 | |
| CN | 108075324 | A | | 5/2018 | |
| CN | 207572679 | U | | 7/2018 | |
| CN | 108961714 | A | | 12/2018 | |
| CN | 108987919 | A | | 12/2018 | |
| CN | 109039840 | A | | 12/2018 | |
| CN | 109656208 | A | | 4/2019 | |
| CN | 110009245 | A | | 7/2019 | |
| CN | 110014930 | A | | 7/2019 | |
| CN | 110084928 | A | | 8/2019 | |
| CN | 209448741 | U | | 9/2019 | |
| CN | 110516788 | A | | 11/2019 | |
| CN | 210006913 | U | | 1/2020 | |
| CN | 110768840 | A | | 2/2020 | |
| CN | 110827457 | A | | 2/2020 | |
| CN | 110994604 | A | | 4/2020 | |
| CN | 111649449 | A | | 9/2020 | |
| CN | 112310753 | A | | 2/2021 | |
| CN | 113285218 | A | * | 8/2021 | ............... H01Q 5/50 |
| CN | 213936532 | U | | 8/2021 | |
| CN | 113381184 | A | | 9/2021 | |
| CN | 113709839 | A | | 11/2021 | |
| CN | 114723040 | A | | 7/2022 | |
| CN | 115296029 | A | * | 11/2022 | ............... H01Q 5/30 |
| CN | 115051151 | B | * | 4/2024 | ............... H01Q 1/38 |
| CN | 113285218 | B | * | 3/2025 | ............. B29C 69/00 |
| EP | 1669912 | A1 | | 6/2006 | |
| EP | 2310981 | A1 | | 4/2011 | |
| EP | 2688144 | A1 | | 1/2014 | |
| GB | 2478762 | A | | 9/2011 | |
| GB | 2504967 | A | | 2/2014 | |
| GB | 2599142 | A | | 3/2022 | |
| JP | 07-085166 | A | | 3/1995 | |
| JP | 11-024735 | A | | 1/1999 | |
| JP | 11-317936 | A | | 11/1999 | |
| JP | 2001-356813 | A | | 12/2001 | |
| JP | 2005-242531 | A | | 9/2005 | |
| JP | 2005-311563 | A | | 11/2005 | |
| JP | 2012-253865 | A | | 12/2012 | |
| JP | 2013-004394 | A | | 1/2013 | |
| JP | 5416066 | B2 | | 2/2014 | |
| JP | 2018-132318 | A | | 8/2018 | |
| JP | 7085166 | B2 | | 6/2022 | |
| KR | 20080002346 | A | | 1/2008 | |
| KR | 10-1172747 | B1 | | 8/2012 | |
| KR | 10-1445367 | B1 | | 10/2014 | |
| KR | 10-1499081 | B1 | | 3/2015 | |
| KR | 10-2016-0063666 | A | | 6/2016 | |
| KR | 10-2017-0113492 | A | | 10/2017 | |
| KR | 10-2216687 | B1 | | 2/2021 | |
| KR | 10-2021-0089867 | A | | 7/2021 | |
| WO | 96/21264 | A2 | | 7/1996 | |
| WO | 2004/029518 | A1 | | 4/2004 | |
| WO | 2005/045715 | A2 | | 5/2005 | |
| WO | 2008/152433 | A1 | | 12/2008 | |
| WO | 2008/157755 | A1 | | 12/2008 | |
| WO | 2009/012319 | A2 | | 1/2009 | |
| WO | 2009/079648 | A1 | | 6/2009 | |
| WO | 2010/004514 | A1 | | 1/2010 | |
| WO | 2010/106474 | A1 | | 9/2010 | |
| WO | 2011/025085 | A1 | | 3/2011 | |
| WO | 2011/043732 | A1 | | 4/2011 | |
| WO | 2011/057173 | A2 | | 5/2011 | |
| WO | 2011/123743 | A1 | | 10/2011 | |
| WO | 2013/062725 | A1 | | 5/2013 | |
| WO | 2013/178819 | A1 | | 12/2013 | |
| WO | 2014/009291 | A1 | | 1/2014 | |
| WO | 2014/098861 | A1 | | 6/2014 | |
| WO | 2014/135517 | A1 | | 9/2014 | |
| WO | 2016113779 | A1 | | 7/2016 | |
| WO | 2016/123536 | A1 | | 8/2016 | |
| WO | 2017/057274 | A1 | | 4/2017 | |
| WO | 2018/222695 | A1 | | 12/2018 | |
| WO | 2019/046580 | A1 | | 3/2019 | |
| WO | 2019/141629 | A1 | | 7/2019 | |
| WO | 2020/016570 | A1 | | 1/2020 | |
| WO | 2020/024553 | A1 | | 2/2020 | |
| WO | 2020/093979 | A1 | | 5/2020 | |
| WO | 2024/087131 | A1 | | 5/2024 | |
| WO | 2024/087134 | A1 | | 5/2024 | |

OTHER PUBLICATIONS

Alam et al., "A Dual-Band CPW-fed miniature planar antenna for S-, C-, WiMAX, WLAN, UWB and X-band applications," Scientific Reports, vol. 12: Article No. 7584, 16 pages, Published May 9, 2022.

Hasan et al., "Dual Band Metamaterial Antenna For LTE/Bluetooth/WiMax System," Scientific Reports, vol. 8, Article No. 1240, 17 pages, Published Online Jan. 19, 2018.

Lamensdorf et al., "Dual-Band Quadrifiliar Helix Antenna," IEEE, p. 488-491, 2001. Accessed May 31, 2022.

Lui et al., "Compact Dual-Frequency PIFA Designs Using LC Resonators," IEEE Transactions on Antennas and Propagation, vol. 49, No. 7, 4 pages, Jul. 2001.

Pattnayak et al., "Antenna Design and RF Layout Guidelines," Cypress Semiconductor Corporation, Document No. 001-91445 Rev. H, pp. 1-60, 2023, www.cypress.com.

"Power Meter with Antenna 2118284-1 Rev," 1 pages, Jun. 2018.

Rennings et al., "A Compact Single/Dual-Band Printed Inverted-F Type Antenna Structure," 8 pages, 2004.

Reuster et al., "A High-Efficiency Broadband HF Wire-Antenna System," IEEE Antennas and Propagation Magazine, vol. 42, No. 4, pp. 53-61, Aug. 2000. Accessed on May 31, 2022.

Siretta, Echo-14 5G/4G/Dual Band Wi-Fi Compact PCB Embedded Antenna Datasheet, Rev 3.2, 20 pages, 2024.

Wikipedia, Inverted-F Antenna, pp. 1-6, 2023. Accessed Jan. 25, 2023.

Narang, "WEBARC: Control and Monitoring of Building Systems Over the Web," 53 pages, May 1999.

Oey et al., "Evaluation of Isolation Compliance Using Real Time Video In Critical Care," North Shore University Hospital, 1 page, Oct. 9, 2015.

Olken et al., "Object Lessons Learned from a Distributed System for Remote Building Monitoring and Operation," ACM SIGPLAN Notices, vol. 33, No. 10, pp. 284-295, Oct. 1998.

Open Blue Companion Desktop User Guide, Johnson Controls, 18 pages, 2022.

Open Blue Digital Twin: Designed for Buildings. Infused with AI, Johnson Controls, 17 pages, 2022. Accessed Aug. 29, 2022.

Open Blue Enterprise Manager User Guide, Johnson Controls, 108 pages, Release 4.1.3, 2022, Accessed Aug. 29, 2022.

Open Blue Enterprise Manager User Guide, Johnson Controls, Release 3.1, 72 pages, Jan. 28, 2021.

Open Blue Enterprise Manager User Guide, Johnson Controls, Release 4.0, 78pages, Nov. 29, 2021.

Open Blue Enterprise Manager, Optimize Building Portfolio Performance with Advanced Data Analystics and AI, Johnson Controls, 20 pages, Accessed Aug. 29, 2022.

Open Blue Location Manager User Guide, Johnson Controls, Release 2.4.7, 28 pages, Jul. 20, 2022.

Open Blue Platform, Make Smarter, Faster, More Data-Driven Decisions, Johnson Controls, 15 pages, 2022. Accessed Aug. 29, 2022.

Open Blue, Now, Spaces have Memory and Identity, Johnson Controls, 20 pages, 2022. Accessed Feb. 10, 2022.

Panduit Corp., "Enable a Building Automation with Panduit Enterprise Solutions," 4 pages, Nov. 2012.

Patents Act 1977: Combined Search and Examination Report under Sections 17 and 18(3), GB Application No. GB2316283.7, GB Intellectual Property Office, Apr. 17, 2024 (9 pages).

Patents Act 1977: Combined Search and Examination Report under Sections 17 and 18(3), UK Intellectual Property Office, Application No. GB2314939.6, Oct. 28, 2024 (7 pages).

Patents Act 1977: Search Report under Section 17, Application No. GB2316189.6, GB Intellectual Property Office, Apr. 2, 2024 (4 pages).

(56) References Cited

OTHER PUBLICATIONS

Peshal B. Nayak et al., "A Novel Compact Dual-Band Antenna Design for WLAN Applications," arxiv.org, Cornell University Library, 201 Olin Library Cornell University, Ithaca, NY 14853, May 12, 2021, XP081973069 (6 pages).
Plug Loads—GSA Sustainable Facilities Tool, US General Services Administration, 1 page, 2023.
Preuveneers et al., "Intelligent Widgets for Intuitive Interaction and Coordination in Smart Home Environments," IEEE Eighth International Conference on Intelligent Environments, pp. 157-164, 2012.
Proliphix, Inc., "Proliphix IP Devices: HTTP API," 28 pages, Jan. 23, 2006.
Proliphix, Inc., Remote Management User Guide, 12 pages, prior to Aug. 27, 2007.
Punn et al., "Monitoring COVID-19 social distancing with person detection and tracking via fine-tuned YOLO v3 and Deepsort techniques," 10 pages, May 6, 2020.
Quirk, "A Brief History of BIM," Arch Daily, Dec. 7, 2012.
Richard Rogan et al., "Smart and Final Food Stores: A Case Study in Web Based Energy Information and Collection," Web Based Energy Information and Control Systems: Case Studies and Application, Chapter 6, p. 59-64, 2005.
Risbeck et al; "Modeling and Multiobjective Optimization of Indoor Airborne Disease Transmission Risk and Associated Energy Consumption for Building HVAC Systems," Energy and Buildings, vol. 253, 24 pages, 2021.
RP-C Pro, Product Datasheet, 1 page, Schneider Electric, 2022.
Saltzman, "Sky-High Electric Bill? Save with Smart Power Outlets, Power strips, LED Bulbs, Thermostats," USA Today, 1 page, 2022.
Samad et al., "Leveraging the Web: A Universal Framework for Building Automation," Proceedings of the 2007 American Control Conference, Jul. 11, 2007.
Sharp, "Actius AL3DU 3D LC Display High Performance 3D Visualization," 2 pages, prior to Mar. 17, 2006.
Shhedi et al., "Traditional and ICT Solutions for Preventing the Hospital Acquired Infection", 2015 20th International Conference on Control Systems and Computer Science, IEEE, May 27, 2015, pp. 867-873, XP033188038.
Silva et al., "Cough localization for the detection of respiratory diseases in pig houses," ScienceDirect, 7 pages, May 28, 2008.
Sinha et al., "9 Key attributes of energy dashboards and analytics tools," https://www.greenbiz.com/blog/2013/08/28/9-key-attributes-energy-dashboards-and=analytics-tools, Aug. 28, 2013.
Sinha et al; "Balance Infection Risk, Sustainability and Comfort with Open Blue," Johnson Controls, 2 pages, 2021.
Sinopoli, "Dashboards For Buildings," http://www/automatedbuildings.com/news/dec10/articles/sinopoli/101119034404sinopoli.html, Dec. 2010.
Sinopoli, "Modeling Building Automation and Control Systems," http://www.automatedbuildings.com/news/jun13/articles/sinopoli/130521122303sinopoli.html, Jun. 2013.
So et al., "Building Automation on the Information Superhighway," ASHRAE (American Society of Heating Refrigerating, and Air Conditioning) Transactions, vol. 104, Part 2, pp. 176-191, 1998.
So et al., "Building Automation Systems on the Internet," Facilities vol. 15, No. 5/6, pp. 125-133, May/Jun. 1997.
Spacelogic RP-C Pro, Product Datasheet, 30 pages, Product Version 2022, Oct. 9, 2023.
Sundramoorthy et al., "DEHEMS: A User-Driven Domestic Energy Monitoring System," Conference Paper, IEEE, 9 pages, Jan. 2011.
Talon, "Raptor Controller," 6 pages, Oct. 2003.
Talon, "Workstation Software," 4 pages, Nov. 2002.
The 4 Best Practices to Conserve Energy in Schools—Blog—Entrak Hong Kong Limited, 1 page, 2022.
The Hub Technical Datasheet, Intuitive IoT Gateway, V1.4, 5 pages, 2022.
Trane (Registered), "Creating Input/Output Object", BMTW-SVP01D-EN, pp. 226-421. (date not available).
Trane (Registered), "Using the Graphics Editor", pp. 422-601. (date not available).
Trane, "System Programming, Tracer Summit Version 14, BMTW-SVP01 D-EN," 623 pages, 2002.
U.S. Appl. No. 18/750,560, filed Jun. 21, 2024.
Wago I/O System Series 750/753, Decentralized Automation Technology, 66 pages, Wago Techdocs, System Manual Version 3.3.3, 2023.
Wattsense Hub, Technical Datasheet, Intuitive loT Gateway, 6 pages, 247able.com, V1.3, 2021.
Wu et al., "A Web 2.0 Based Scientific Application Framework," 7 pages, prior to Jul. 24, 2014.
www.geappliances.com/home-energy-manager/about-energy-monitors.htm, "Energy Monitor, Home Energy Monitors, GE Nucleus," 2 pages, printed Jan. 15, 2013.
www.luciddesigngroup.com/network/apps.php#homepage, "Lucid Design Group—Building Dashboard Network—Apps," 7 pages, Jan. 15, 2013.
Xiamoi Smart Plug 2, (Wi-Fi), Overview, 1 page, 2023.
Zito, "What is Tridium Part 1," http://blog.buildingautomationmonthly.com/what-is-tridium/, May 12, 2013.
Zito, "What is Tridium Part 2," http://blog.buildingautomationmonthly.com/tridium-part-2/, Sep. 10, 2013.
"America's Largest Managed Security Services Provider Launches Comprehensive, Integrated Covid-19 Safety Program for Office Buildings and Suites," KastleSafeSpaces, 5 pages, May 11, 2020.
"An Overview of NiagraAX: A comprehensive software platform designed to create smart device applications," Tridium, Inc., 2005.
"Attune Advisory Services," press release, Honeywell International Inc., Mar. 20, 2012.
"BACnet Protocol Implementation Conformance Statement" for enteliWEB, Delta Controls, Jul. 17, 2013.
"Biometric Door Reader With Body Temperature Detection," Kintronics, 9 pages, accessed May 21, 2020.
"Body Surface Temperature Screening with Alarm Function TVS-200IS/TVS-500IS," Nippon Avionics Co., 3 pages, accessed May 21, 2020.
"BriefCam announces video analytics innovation for contact tracing, physical distancing, occupancy management and face mask detection," BriefCam LTD, 11 pages, Jun. 5, 2020.
"Building Automation Software Solutions," Iconics, 2013.
"Contact Tracing Now Available on Identiv's Hirsch Velocity Access Control Platform," IDENTIV, 5 pages, May 21, 2020.
"Creston Special Report: How Intelligent building management solutions are reducing operational costs," Creston, 2012.
"Data analytics and smart buildings increase comfort and energy efficiency", https://www.microsoft.com/itshowcase/Article/Content/845/Data-analytics-and-smart-buildings-increase-comfort-and-energy-efficiency, Dec. 19, 2016, 8 pages.
"Facial Attendace System With Temperature Screening Now In India," IANS, 5 pages, Mar. 19, 2020.
"FebriEye-AI Based Thermal Temperature Screening System," vehant, 1 page, 2020.
"How Smarter AI-Powered Cameras Can Mitigate the Spread of Wuhan Novel," AnyConnect, 22 pages, 2020.
"How to fight COVID-19 with machine learning," DataRevenue, 20 pages, accessed May 25, 2020.
"INNCONTROL 5," Honeywell, 2 pages, Aug. 8, 2018.
"Intelligent Building Management Systems in Miami," Advanced Control Corp., Mar. 7, 2013.
"IP Door Access Control," KINTRONICS, 21 pages, 2014.
"Kogniz AI Health Response Platform," Kogniz, 9 pages, accessed May 21, 2020.
"Machine Learning Could Check If You're Social Distancing Properly at Work," MIT Technology Review, 7 pages, Apr. 17, 2020.
"NEC launches dual face biometric and fever detection system for access control," BIOMETRIC Update, 4 pages, May 8, 2020.
"NiagraAX Product Model Overview," Tridium, Inc., 2005.
"Phoenix Controls Portal," Phoenix Controls, Inc., 2013.
"Plan to Re-Open," EHIGH, 16 pages, accessed Jun. 13, 2020.
"Remote temperature monitoring," AXIS Communication, 10 pages, 2014.

(56) References Cited

OTHER PUBLICATIONS

"See The World In A New Way Hikvision Thermal Cameras," HIKVISION, 12 pages, 2017.
"The Ohio State University," BACnet International Journal, vol. 5, p. 4, Jan. 2013.
"Thermal Imaging SmartPhone Can Be used For Temperature Screening of People," CAT, 3 pages, accessed Jul. 13, 2020.
"WEBs-AX Web-Enabled Building Solutions," sales brochure, Honeywell International Inc., Mar. 2009.
http://www. docs. hvacpartners. com/idc/grou ps/public/documents/techlit/gs-controls-ivuccn.rtf, "Products," 5 pages, printed Jul. 3, 2007.
"4.0 Today's Activities, The Home Dashboard," CRBM info@hand website, 46 pages, prior to Apr. 25, 2013.
"ASHRAE Dashboard Research Project," 2 pages, Aug. 28, 2008.
"Energy Manager User Guide," Release 3.2, Honeywell, 180 pages, 2008.
"Free Facilities Dashboards," eSight Energy Website, 2 pages, prior to Apr. 25, 2013.
"Fuzzy Logic Toolbox 2.1, Design and Stimulate Fuzzy Logic Systems," The MathWorks, 2 pages, May 2004.
"Junk Charts, Recycling Chartjunk as junk art," 3 pages, Oct. 2, 2006.
"Model Predictive Control Toolbox 2, Develop Internal Model-Based Controllers for Constrained Multivariable Processes," The MathWorks, 4 pages, Mar. 2005.
"Statistics Toolbox, for Use with Matlab," User's Guide Version2, The MathWorks, 408 pages, Jan. 1999.
"Vykon Energy Suite Student Guide," Tridium Inc., 307 pages, Mar. 3, 2006.
"Web Based Energy Information Systems for Energy Management and Demand Response in Commercial Buildings," California Energy Commission, 80 pages, Oct. 2003.
A Bold New Direction, "The Next Generation Global Integration Controller", 7 pages. (date not available).
ABB, "White Paper-Predictive Maintenance Goes Mainstream", Memphis, TN, 5 pages, 2020.
Alerton Building Controls, Gallery Prints, 7 pages, Dec. 19, 2013.
Allain, "Trying out the iPhone Infrared Camera: The FLIR One," WIRED, 15 pages, 2014.
Andover Controls World, 4 pages, Spring 1997.
Andover Controls, Network News, vol. 2, No. 2, 8 pages, 1997.
ASHRAE Research for EMCS Dashboard, available online at: <https://www.taylor-engineering.com/dashboard/>, May 30, 2013, 2 pages.
Automated Buildings.com Press Release—New Products, BACnet Testing Laboratories, 9 pages, Nov. 2016.
Awesome Things you can do with a Smart Plug—Blog—carbonTRACK® 1 page, 2021.
Ball, Green Goal of 'Carbon Neutrality' Hits Limit, TheWall Street Journal, 7 pages, Dec. 30, 2008.
Bell et al., "Early Event Detection-Results from A Prototype Implementation," AICHE Spring National Meeting, 15 pages, Apr. 2005.
Bobker et al., "Operational Effectiveness in Use of BAS," Proceedings of the 13th International Conference for Enhanced Building Operations, Oct. 8, 2013.
Bocicor et al. "Wireless Sensor Network based System for the Prevention of Hospital Acquired Infections", arxiv.org, Cornell University Ithaca, NY 14853, May 2, 2017, XP080947042, (Abstract).
Bouktif et al., "Optimal Learning LSTM Model for Electric Loan Forecasting Using Feature Selection and Genetic Algorithm: Comparison with Machine learning Approaches," Energies, vol. 11, pp. 1-20. Published Jun. 2018.
CADGRAPHICS, "The CADGRAPHICS User's Guide," 198 pages, 2003.
Carrier Comfort Network CCN Web, "Web Browser User Interface to the Carrier Comfort Network," 2 pages, 2002.
Carrier Comfort Network CCN Web, Overview and Configuration Manual, 134 pages, Apr. 2006.
Carrier Comfort Network CCN Web, Product Data, 2 pages, Apr. 2006.
Carrier, "i-Vu Powerful and Intuitive Front End for Building Control," 2 pages, Aug. 2005.
Carrier, "i-Vu Web-Based Integrated Control System," 3 pages, 2005.
Carrier, Demo Screen Shots, 15 pages, prior to Aug. 27, 2007.
Carrier, i-Vu CCN 4.0, Owner's Guide, 20 pages, Jul. 2007.
Carrier, i-Vu CCN, 7 pages, 2007.
Carter, "Industrial Energy Management Dashboards Require a Toolkit," Cross Automation, 11 pages, Nov. 4, 2013.
Castangia et al., "Detection of Anamolies in Household Appliances from Disaggregated Load Consumption," International Conference on Smart Energy Systems and Technologies, 2021. 6 pages. Downloaded on Oct. 30, 2023 from IEEE Xplore.
Castelo, "A 30 Interactive Environment for Automated Building Control," Elsevier, Nov. 8, 2012.
Castle, "7 Software Platforms that Make Building Energy Management Easy," http://greentechadvocates.com/2012/11/28/7-software-platforms-that-make-building-energy-managment-easy/, Nov. 28, 2012.
Cericola, The 4 Best Plug-In Smart Outlets of 2023, Reviews by New York Times Wirecutter, 5 pages, Updated Oct. 25, 2023. Accessed Oct. 26, 2023.
Cericola, The Best Plug-In Smart Outlet, Reviews by New York Times Wirecutter, 1 page, 2022.
Chan, "Rank Revealing QR Factorizations," Linear Algebra and It's Applications, vol. 88-89, p. 67-82, Apr. 1987.
Cimetrics BACnet Explorer (B5001), 9 pages, 2023. Accessed Oct. 26, 2023.
Circon, "i-Browse Web-Based Monitoring and Control for Facility Management," 2 pages, prior to Aug. 27, 2007.
Controller BACnet/IP (750-831) WAGO India, 5 pages, 2023. Accessed Oct. 26, 2023.
Copper Cube Setup Guide, Copper Tree Analytics, Delta Controls Inc., Document Edition 3.0, 20 pages, Feb. 2020.
Published Australian Application 2009904740, 28 pages, Application Filed on Sep. 29, 2009.
Search Report and Written Opinion from related International PCT Application No. PCT/US2018/025189 dated Jul. 17, 2018 (12 pages).
U.S. Appl. No. 14/109,496, filed Dec. 17, 2013.
U.S. Appl. No. 14/169,071, filed Jan. 30, 2014.
U.S. Appl. No. 14/169,083, filed Jan. 30, 2014.
U.S. Appl. No. 14/461,188, filed Aug. 15, 2014.
U.S. Appl. No. 14/482,607, filed Sep. 10, 2014.
Dasgupta, "Your voice may be able to tell you if you have Covid," Hindustan Times, 4 pages, Apr. 16, 2020.
Donnelly, "Building Energy Management: Using Data as a Tool", http://www.buildingefficiencyinitiative.org/sites/default/files/legacy/InstituteBE/media/Library/Resources/Existi ng-Buil ding-Retrofits/Using-Buil ding-Data-as-a-Tool.pdf, Oct. 2012, 9 pages.
e-homecontrols.com, "e-Home Controls Website," link to actual website no longer works, 1 page, prior to Dec. 19, 2013.
Echelon, "Energy Control Solutions with the i.Lon SmartServer," 4 pages, 2007.
Echelon, "i.Lon 100e3 Internet Server Models 72101R-300, 72101R-308, 72102R-300, 72103-R300 . . . " 5 pages, copyright 2002-2007.
Echelon, "i.Lon 100e3 Internet Server New Features," 15 pages, Sep. 2006.
Echelon, "i.Lon SmartServer," 5 pages, 2007.
Ecobee, "Meet the Ecobee Smart Thermostat," Sales Sheet, 2 pages, prior to Jun. 16, 2009.
Ecobee, Screenshot of Ecobee Web Site Window, Captured prior to Jun. 16, 2009.
Ecobee, Smart Installation Manual, pp. 1-26, 2009.
Ecobee, Smart Thermostat User Manual, pp. 1-32, 2009.
EMbox Timer Switch Electrical On Off-Automatic Power Cut Off Smart Plug, Amazon Product Sheet, 1 page, 2022.
Energy Management Savings Tips for Hotels, Hotel Management Newsletter, 7 pages, 2022. Accessed Oct. 26, 2022.
EnteliWEB catalog sheet, Delta Controls, Inc., 2012.
EnteliWEB catalog sheet, Delta Controls., 2010.

(56) References Cited

OTHER PUBLICATIONS

EnteliWEB product from Delta Controls, web pages retrieved on May 9, 2013 from http://deltacontrols.com/products/facilities-management/supervisory-software et seq. by the Internet Archive at web.archive.org.
EP Extended European Search Report, EP Application No. 23201990.1, European Patent Office, Apr. 26, 2024 (13 pages).
Extended European Search Report, EP application No. 20151295.1, pp. 13, May 26, 2020.
Extended European Search Report, EP Application No. 24150166.7, European Patent Office, Jun. 7, 2024 (9 pages).
Extended European Search Report, EP Application No. 24151591.5, European Patent Office, Jun. 4, 2024 (8 pages).
Fully Web-Based BACnet Compliant Building Management System, WEBfactory, 1 page, 2023.
Ganguty, "Gurugram-based startup Staqu has modified AI-powered JARVIS to battle coronavirus," YOURSTORY, 7 pages, Mar. 31, 2020.
GB Search Report, GB Application No. GB2101308.1, dated Jul. 23, 2021 (7 pages).
Hiliwi Technology, HLW8110/HLW8112 Datasheet, Rev 1.01, 74 pages, Updated Schematic, Nov. 20, 2020.
HLW Technology (Registered), HLW8110/HLW8112 DataSheet, REV 1.01, 74 pages. (date not available).
Honeywell News Release, "Honeywell's New Sysnet Facilities Integration System for Boiler Plant and Combustion Safety Processes," 4 pages, Dec. 15, 1995.
Honeywell, "Excel Building Supervisor-Integrated R7044 and FS90 Ver. 2.0," Operator Manual, 70 pages, Apr. 1995.
Honeywell, "Product Guide 2004," XP-002472407, 127 pages, 2004.
Honeywell, "Introduction of the S7350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.
Honeywell, Excel 15B W7760B Building Manager Release 2.02.00, Installation Instructions, 28 pages, Dec. 2004.
Honeywell, The RapidZone Solution, Excel 5000 Open System, Application Guide, 52 pages, Jan. 2004.
How Pert's Smart Home Automation Products can help you Save Energy & Money, Pert™ 25 pages, Dec. 5, 2021. Accessed Oct. 26, 2022.
http://pueblo.lbl.gov/~olken . . . , "Remote Building Monitoring and Operations Home Page," 5 pages, prior to Aug. 27, 2007.
http://www.ccbac.com, "C&C (/)—Omniboard," 5 pages, Dec. 19, 2013.
http://www.commercial.carrier.com/commercial/hvac/productdescription . . . , "Carrier: 33CSCCNWEB-01 CCN Web Internet Connection to the Carrier Comfort Network," 1 page, printed Mar. 11, 2008.
http://www.commercial.carrier.com/commercial/hvac/productdescription . . . , "Carrier: i-Vu CCN," 1 page, printed Mar. 11, 2008.
http://www.domcontroller.com/en/, "DomController Home Automation Software—Control Anything from Anywhere," 11 pages, printed Jan. 6, 2015.
http://www.ecobee.com/productspecifications, "Programmable Thermostats and Other Green Living Products—Specifications," 2 pages, 2009.
http://www.lightstat.com/products/istat.asp, Lightstat Incorporated, "Internet Programmable Communicating Thermostats," 1 page, printed Mar. 13, 2007.
http://www.novar.com/ems-bas/opus-building-automation-system, "Novar OPUS BAS," 1 page, prior to Feb. 13, 2013.
http://www.sharpsystems.com/products/pc_notebooks/actius/rd/3d/, "Actius RD3D Desktop Replacement Notebook with Industry-Breakthrough 3D Screen," Sharp, 1 page, printed Jun. 16, 2005.
http://www2.sims.berkeley.edu/courses/is213/s06/projects/lightson;final.html, "Lights On A Wireless Lighting Control System," 11 pages, printed Mar. 22, 2007.
I-stat, Demo Screen Shots, 9 pages, printed Mar. 13, 2007.
I-stat, The Internet Programmable Thermostat, 2 pages, prior to Aug. 27, 2007.
I.Lon 100e3 Internet Server, 1 page, prior to Aug. 27, 2007.
I.Lon, SmartServer, 2 pages, prior to Aug. 27, 2007.
I4BACnet The Web-based Management Control System for your Building Management System, 5 pages, Ewon® By HMS Networks, 2023. Accessed Oct. 26, 2023.
Infineon Technologies, "Predictive Maintenance and Condition Monitoring," 17 pages, Downloaded Sep. 14, 2023.
Instituto Superior Tecnico, "A 3D Interactive Environment for Automated Building Control," Master's Dissertation, 120 pages, Nov. 2012.
International Search Report and Written Opinion received for PCT Patent Application No. PCT/CN2022/128109, mailed on Jun. 23, 2023, 6 pages.
International Search Report and Written Opinion received for PCT Patent Application No. PCT/CN2022/128112, mailed on Dec. 29, 2022, 6 pages.
International Search Report and Written Opinion received for PCT Patent Application No. PCT/CN2022/128113, mailed on Jul. 5, 2023, 6 pages.
International Search Report and Written Opinion received for PCT Patent Application No. PCT/CN2022/128115, mailed on Jun. 23, 2023, 9 pages.
Jeffrey Ball, "Green Goal of 'Carbon Neutrality' Hits Limit," TheWall Street Journal, 7 pages, Dec. 30, 2008.
Johnson Controls and Microsoft Announce Global Collaboration, Launch Integration between Open Blue Digital Twin and Azure Digital Twins, 7 pages, 2022. Accessed Aug. 29, 2022.
Johnson Controls Develops Industry-first AI Driven Digital Solution to Manage Clean Air, Energy, Sustainability, Comfort and Cost in Buildings, 7 pages, 2022. Accessed Aug. 29, 2022.
Johnson Controls, Network Integration Engine (NIE) 3 pages, Nov. 9, 2007.
Johnson Controls, Network Integration Engine (NIE), Product Bulletin, pp. 1-11, Jan. 30, 2008.
Johnson Controls, Verasys System European User's Guide, 30 pages, Release 4.0, Oct. 30, 2020.
Johnson Controls, Verasys System European User's Guide, 38 pages, 2023. Accessed Oct. 26, 2023.
Kim et al., "Applicance Classification by Power Signal Analysis Based on Multi-Feature Combination Multi-Layer LSTM," Energies, vol. 12, pp. 1-24. Published Jul. 21, 2019.
Kourti, "Process Analysis and Abnormal Situation Detection: From Theory to Practice," IEEE Control Systems Magazine, p. 10-25, Oct. 2002.
Kufakunesu et al., A Survey on Adaptive Data Rate Optimization in LoRaWAN: Recent Solutions and Major Challenges, Sensors, vol. 20, No. 5044, 25 pages, Published Sep. 5, 2020.
Lacey, "The Top 10 Software Vendors Connecting Smart Buildings to the Smart Grid," http://www.greentechmedia.com/articles/read/the-top-10-companies-in-enterprise-smart-grid, Jul. 18, 2013.
Legrand Brand Photos, Prior Art Product, 1 page, Photos dated on or before Nov. 30, 2023.
Li et al., "How Agile is the Adaptive Data Rate Mechanism of LoRaWAN?" IEEE, 6 pages, 2018. Downloaded Aug. 28, 2018.
Lucid Design Group, Inc., "Building Dashboard," 2 pages, Printed May 30, 2013.
Mathew, "Action-Oriented Benchmarking, Using CEUS Date to Identify and Prioritize Efficiency Opportunities in California Commercial Buildings," 26 pages, Jun. 2007.
Morrison et al., "The Early Event Detection Toolkit," Honeywell Process Solutions, 14 pages, Jan. 2006.

* cited by examiner

PRINTED CIRCUIT BOARD IMPLEMENTED MULTIBAND ANTENNA

TECHNICAL FIELD

The present disclosure pertains to antennas that may be used in a variety of wireless applications and more particularly pertains to dual band antennas.

BACKGROUND

A variety of electronic devices utilize antennas for wirelessly transmitting and/or receiving information. In some cases, it may be desirable for an electronic device to have the capability of communicating over two or more different frequency bands. What would be desirable is a dual band antenna that can be easily and inexpensively incorporated into a variety of different electronic devices to support communication over each of two different frequency bands.

SUMMARY

This disclosure pertains to generally antennas that may be used in a variety of wireless applications and more particularly pertains to dual band antennas having a small frequency band separation. An example may be found in a printed circuit board implemented multiband antenna. The illustrative printed circuit board implemented multiband antenna includes a first antenna leg supported by a printed circuit board, the first antenna leg having a length, with a first end region of the first antenna leg operatively connected to a ground plane of the printed circuit board and a second end region of the first antenna leg extending away from the first end region of the first antenna leg in a first direction. A second antenna leg is supported by the printed circuit board, the second antenna leg having a length, with a first end region of the second antenna leg connected to the second end region of the first antenna leg, and with a second end region of the second antenna leg extending away from the first end region of the second antenna leg in a second direction that is orthogonal to the first direction. A third antenna leg is supported by the printed circuit board, the third antenna leg having a length, with a first end region of the third antenna leg connected to the second end region of the second antenna leg, and with a second end region of the third antenna leg extending away from the first end region of the third antenna leg in a direction that is opposite to the first direction. A fourth antenna leg is supported by the printed circuit board, the fourth antenna leg having a length, with a first end region of the fourth antenna leg connected to the second end region of the third antenna leg, and with a second end region of the fourth antenna leg extending away from the first end region of the fourth antenna leg in a direction that is opposite to the second direction and toward the first antenna leg. A fifth antenna leg is supported by the printed circuit board, the fifth antenna leg having a length extending parallel to the first antenna leg with the fifth antenna leg connected to the second end region of the fourth antenna leg. A sixth antenna leg is supported by the printed circuit board, the sixth antenna leg having a length, with a first end region of the sixth antenna leg electrically coupled to an antenna signal trace of the printed circuit board, and with a second end region of the sixth antenna leg extending away from the first end region of the sixth antenna leg in a direction that is parallel with the first antenna leg and is connected to the second antenna leg at an intermediate location along the length of the second antenna leg, the sixth antenna leg spaced from the first antenna leg by a first gap along the length of the sixth antenna leg, and the sixth antenna leg extending between the first antenna leg and the fifth antenna leg and spaced from the fifth antenna leg by a second gap along the length of the fifth antenna leg.

Another example may be found in a printed circuit board implemented antenna. The illustrative printed circuit board implemented antenna includes an antenna leg supported by a printed circuit board, the printed circuit board having a plurality of different metal layers. The antenna leg has a length extending between a first end and a second end of the antenna leg. The antenna leg includes a plurality of series connected metal segments. Each of at least two of the plurality of series connected metal segments is electrically connected to at least two neighboring metal segment of the plurality of series connected metal segments, and wherein each of the at least two of the plurality of series connected metal segments is formed on a different metal layer of the printed circuit board than each of the at least two neighboring metal segment and is connected to each of the at least two neighboring metal segment through one or more Vias of the printed circuit board.

Another example may be found in a printed circuit board implemented multiband antenna. The illustrative printed circuit board implemented multiband antenna includes a plurality of antenna legs arranged within a rectangular area on a printed circuit board of less than 260 millimeters square with each formed using one or more metal layers of the printed circuit board. The plurality of antenna legs are arranged to support two different antenna modes in accordance with a selected one of two impedance-matching circuits of an antenna driving circuit, including a first antenna mode that includes a first band with a return loss of less than −10 dB at 868 MHz and a second band with a return loss of less than −10 dB at 2.4 GHz, and a second antenna mode that includes a third band with a return loss of less than −10 dB at 915 MHz and the second band with a return loss of less than −10 dB at 2.4 GHz.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

Figure 2:
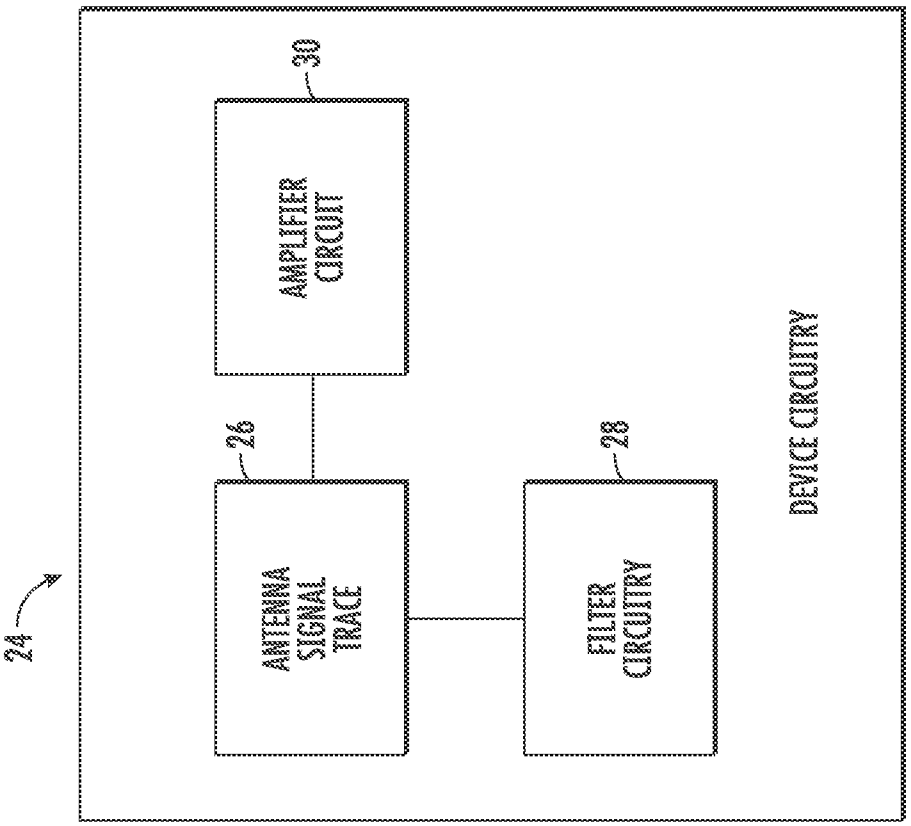
FIG. 2 is a schematic block diagram showing an illustrative device circuitry forming part of the illustrative printed circuit board of FIG. 1.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The term "about" means within a range of plus or minus 10 percent of the expressed number. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

A multiband antenna is described herein. The multiband antenna may be an antenna formed using one or more metal layers of a Printed Circuit Board (PCB). In some cases, the multiband antenna may provide a first frequency band and a second frequency band, where the second frequency band is different from the first frequency band. As an example, the multiband antenna may provide a first frequency band that includes or is centered around 868 MHz and a second frequency band that includes or is centered around 2.4 GHz. As another example, the multiband antenna may provide a first frequency band that includes or is centered around 915 MHz and a second frequency band that includes or is centered around 2.4 GHz. In some instances, a tuned impedance-matching circuit may be used with the multiband antenna to selectively achieve the first frequency band that includes or is centered around 868 MHz and/or to selectively achieve the first frequency band that includes or is centered around 915 MHz. In some cases, the impedance-matching circuit may be tuned to achieve the desired first frequency band for use in electronic devices intended for use in a particular part of the world. As an example, a frequency band that includes or is centered at 868 MHz may be useful for electronic devices used in Europe while a frequency band that includes or is centered at 915 MHz may be useful for electronic devices used in the United States.

In some cases, the multiband antenna may be used in a building control device, such as a building controller. The building controller may be, for example, a damper actuator controller, a thermostat, a smart plug socket, a mobile remote control device, and/or any other suitable building controller device. In some cases, the multiband antenna may be used in a consumer electronics device such as a smart phone, tablet, laptop, desktop and or any other suitable consumer electronics device as desired. These are only examples and non-limiting. It is contemplated that the multiband antenna disclosed herein may be used in any suitable device.

An example multiband antenna includes a ground plane formed by one or more conductive layers of a Printed Circuit Board (PCB). In some cases, conductive layer(s) and insulative layer(s) of the PCB may have a total thickness of 1.6 millimeters or less. The PCB insulative layer(s) may be formed of, or otherwise include, FR4. FR4 is a fiberglass-reinforced epoxy laminate material, and is considered to be flame-retardant. FR-4 fiberglass epoxy has a good strength to weight ratio.

Figure 1:
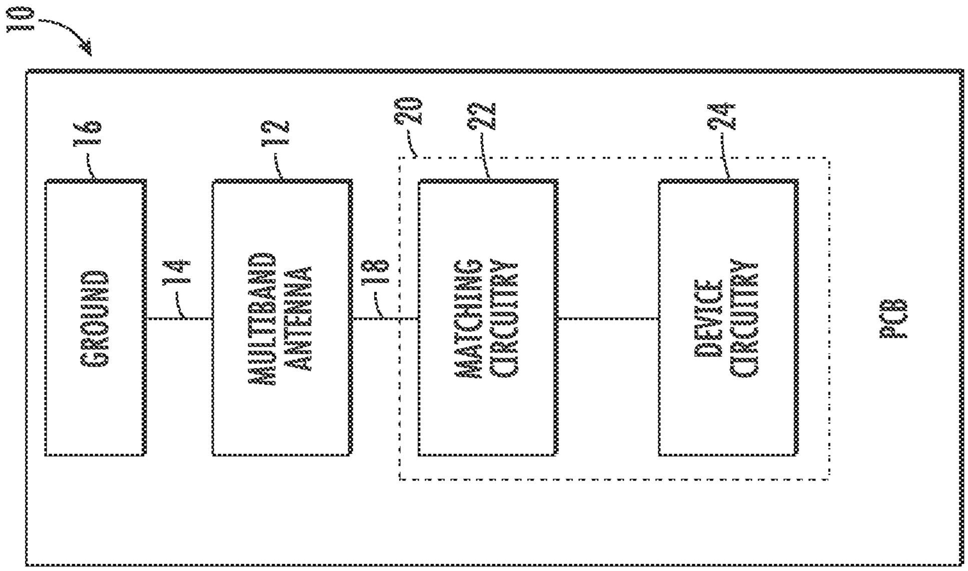
FIG. 1 is a schematic block diagram showing an illustrative printed circuit board including a multiband antenna.

FIG. 1 is a schematic block diagram showing an illustrative printed circuit board (PCB) 10. The illustrative PCB 10 may be utilized in any of a variety of different electronic devices, particular electronic devices that are configured to communicate with other devices using more than one frequency band. The PCB 10 includes a multiband antenna 12. The multiband antenna 12 may include an antenna lead 14 that is configured to be electrically connected with a ground plane 16 of the PCB 10. The multiband antenna 12 may include an antenna lead 18 that is electrically connected with circuitry 20 that is formed on or within the PCB 10. In some instances, the circuitry 20 may include impedance-matching circuitry 22 that is tuned for a particular frequency or frequencies. For example, the impedance-matching circuitry 22 may be tuned for a first frequency band that includes or is centered around 868 MHz and a second frequency band that includes or is centered around 2.4 GHz. As another example, the impedance-matching circuitry 22 may be tuned for a first frequency band that includes or is centered around 915 MHz and a second frequency band that includes or is centered around 2.4 GHZ.

In some instances, the circuitry 20 may also include device circuitry 24. The device circuitry 24 may include any of a variety of different electronic circuits that allow the electronic device bearing the PCB 10 to function. In some instances, the device circuitry 24 may include additional circuitry that helps the electronic device to better function with the multiband antenna 12. FIG. 2 is a schematic block diagram showing illustrative device circuitry 24. As an example, the device circuitry 24 may include an antenna signal trace 26 that allows the multiband antenna 12 to be connected to various device circuitry 24. In some instances, the device circuitry 24 may include filter circuitry 28 that may be used to filter signals to and/or from the multiband antenna 12. In some cases, the device circuitry 24 may include an amplifier circuitry 30 that may be used to amplify signals to and/or from the multiband antenna 12. In some cases, the filter circuitry 28 may be interposed between the antenna signal trace 26 and the amplifier circuitry 30. The amplifier circuitry 30 may in some cases have a receive mode and/or a transmit mode. When in the receive mode, the amplifier circuitry 30 may amplifier signals received from the multiband antenna 12 via the antenna signal trace 26, and provide the amplified signals to processing and/or other circuitry (not shown) on the PCB 10. When in the transmit mode, the amplifier circuitry 30 may amplifier signals received from processing and/or other circuitry (not shown) on the PCB 10 and provide the amplified signals to the antenna signal trace 26 of the multiband antenna 12. These are just examples.

Figure 3:
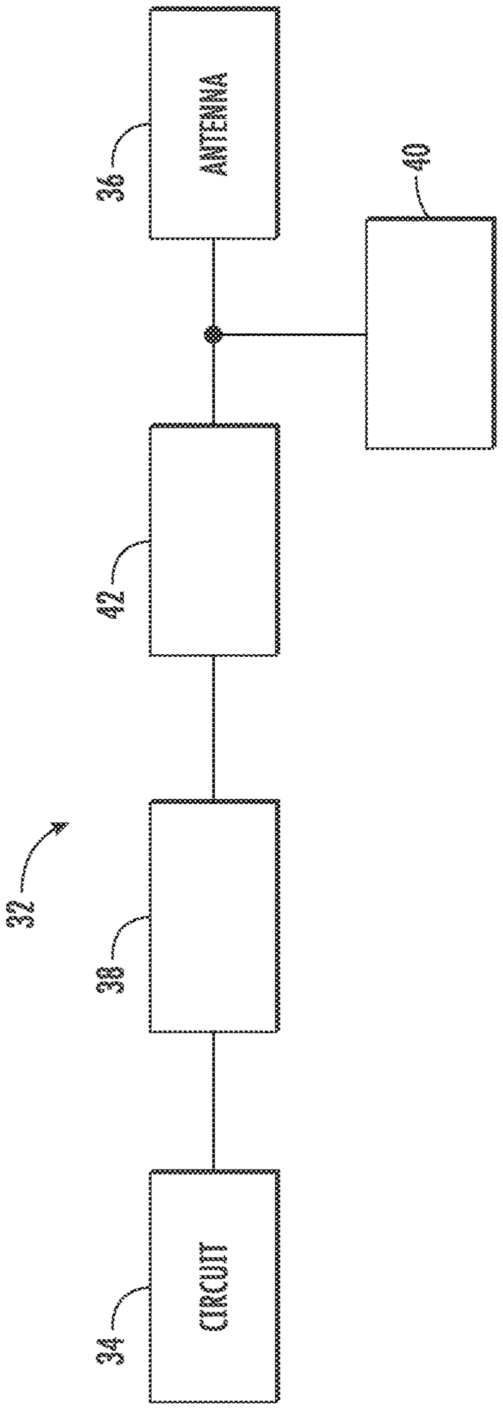
FIG. 3 is a schematic block diagram showing an illustrative impedance-matching circuit usable in the illustrative printed circuit board of FIG. 1 and tuned for dual bandwidths at 868 MHz and 2.4 GHz.

FIG. 3 is a schematic block diagram showing an illustrative impedance-matching circuitry 32 that may be considered as being an example of the impedance-matching circuitry 22 shown in FIG. 1. The illustrative impedance-matching circuitry 32 may be considered as being tuned to provide for a first frequency band that includes or is centered around 868 MHz and a second frequency band that includes or is centered around 2.4 GHz. The impedance-matching circuitry 32 is coupled between a circuit 34 that may be considered as representing the device circuitry 24 and an antenna 36 that may be considered as representing the multiband antenna 12. The impedance-matching circuitry 32 includes a first inductor 38, a second inductor 40 and a third inductor 42. In some cases, the first inductor 38 may have an inductance of 1.8 nH (nanoHenry), the second inductor 40 may have an inductance of 2.2 nH, and the third inductor 42 may have an inductance of 1.8 nH. The second inductor 40 may be coupled to ground.

Figure 4:
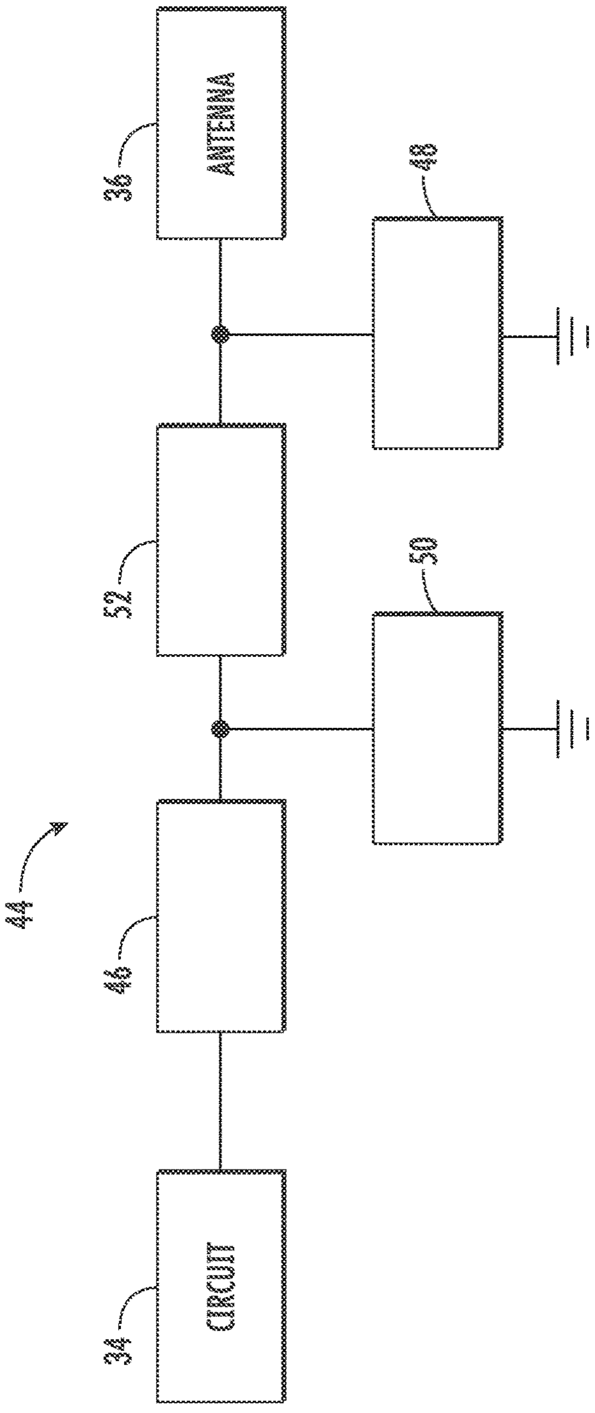
FIG. 4 is a schematic block diagram showing an illustrative impedance-matching circuit usable in the illustrative printed circuit board of FIG. 1 and tuned for dual bandwidths at 915 MHz and 2.4 GHz.

FIG. 4 is a schematic block diagram showing an illustrative impedance-matching circuitry 44 that may be considered as being an example of the impedance-matching circuitry 22 shown in FIG. 1. The illustrative impedance-matching circuitry 44 may be considered as being tuned to provide for a first frequency band that includes or is centered around 915 MHz and a second frequency band that includes or is centered around 2.4 GHz. The impedance-matching circuitry 44 is coupled between the circuit 34 that may be considered as representing the device circuitry 24 and the antenna 36 that may be considered as representing the multiband antenna 12. The impedance-matching circuitry 44 includes a first inductor 46, a second inductor 48, a first capacitor 50 and a second capacitor 52. In some cases, the first inductor 46 may have an inductance of 5.6 nH (nanoHenry) and the second inductor 48 may have an inductance of 39 nH. The first capacitor 50 may have a capacitance of 1 pF (picofarad) and the second capacitor 52 may have a capacitance of 1.8 pF. In some instances, the second inductor 48 and the first capacitor 50 may each be connected to ground.

Figure 5:
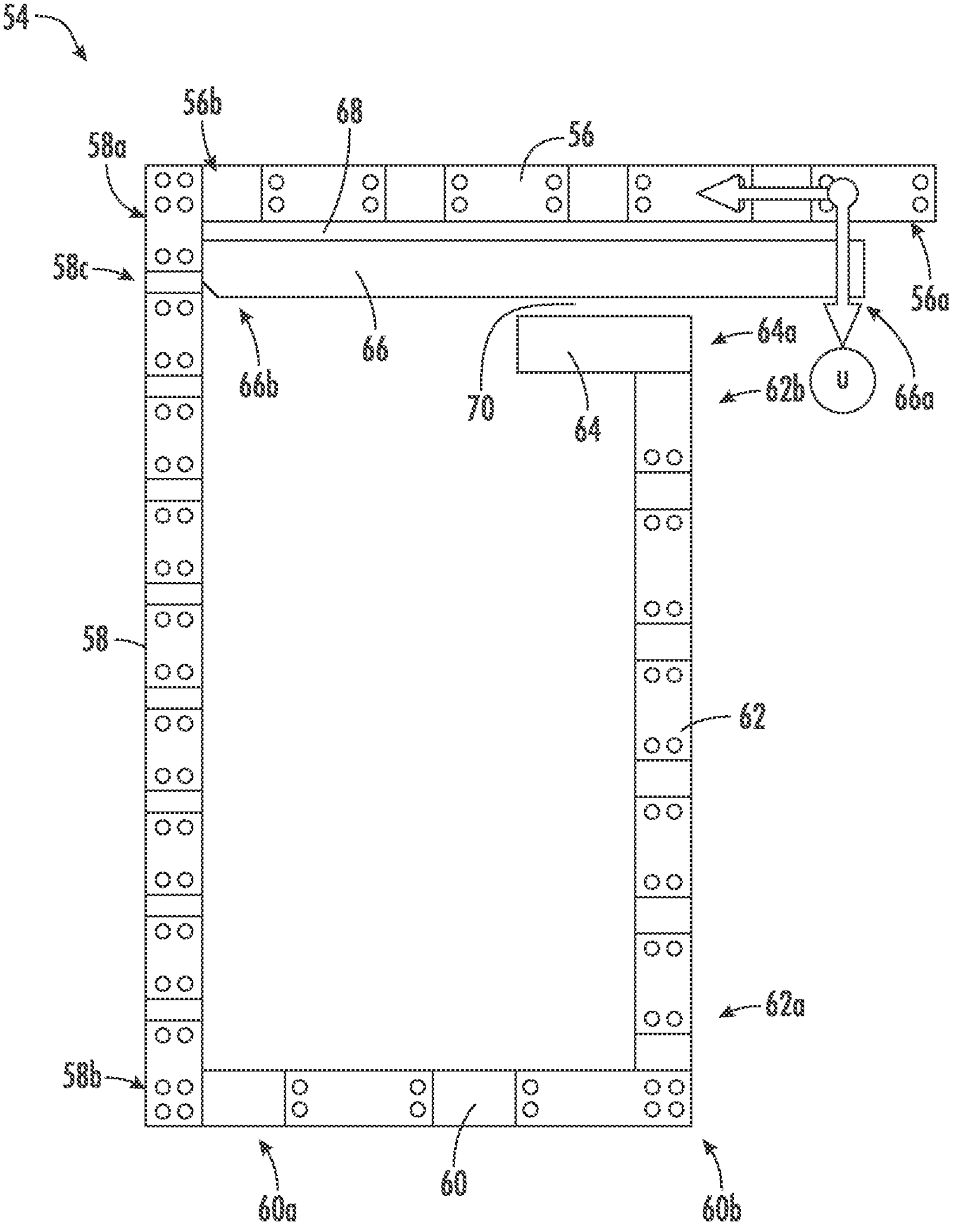
FIG. 5 is a schematic view of an illustrative multiband antenna that may represent the multiband antenna of the printed circuit board of FIG. 1.

FIG. 5 is a schematic view of an illustrative multiband antenna 54. The illustrative multiband antenna 54 may be considered as being an example of the multiband antenna 12. In some instances, the multiband antenna 54 may have a first frequency band that includes or is centered at 868 mH or 915 mH, depending on impedance-matching circuitry 32 or 44, and a second frequency band that includes or is centered at 2.4 GHz. In some instances, 2.4 GHz may be considered as being a Bluetooth frequency. In some instances, the multiband antenna 54 may have a first band with a return loss of less than −10 dB at 868 MHz and a second band with a return loss of less than −10 dB at 2.4 GHZ. In some instances, the multiband antenna 54 may have a first band with a return loss of less than −10 dB at 915 MHz and a second band with a return loss of less than −10 dB at 2.4 GHz. In some cases, the multiband antenna 54 may have a first band with a return loss of less than −10 dB at 868 MHz, a second band with a return loss of less than −10 dB at 915 MHz and a third band with a return loss of less than −10 dB at 2.4 GHZ.

The illustrative multiband antenna 54 includes a first antenna leg 56, a second antenna leg 58, a third antenna leg 60, a fourth antenna leg 62, a fifth antenna leg 64 and a sixth antenna leg 66 that are each supported by a printed circuit board such as the PCB 10. The multiband antenna 54 may have a small profile in which all of the first antenna leg 56, the second antenna leg 58, the third antenna leg 60, the fourth antenna leg 62, the fifth antenna leg 64 and the sixth antenna leg 66 all fit into a rectangular area on the PCB 10 that is less than 400 square millimeters. The multiband antenna 54 may fit into a rectangular area of less than 300 square millimeters. The multiband antenna 54 may fit into a rectangular area of about 260 square millimeters. As shown, the rectangular area has dimensions of 14.70 millimeters by 17.65 millimeters, which corresponds to an area of 259.46 square millimeters.

The first antenna leg 56 has a first end region **56*a* that is configured to be operatively coupled to a ground plane of the printed circuit board (such as the ground 16) and a second end region 56*b* that extends away from the first end region 56*a* of the first antenna leg 56 in a first direction (to the left, in the illustrated orientation). The second antenna leg 58 has a first end region 58*a* that is connected to the second end region 56*b* of the first antenna leg 56. The second antenna leg 58 has a second end region 58*b* extending away from the first end region 58*a* in a second direction that is orthogonal to the first direction, and downward (in the illustrated orientation). The third antenna leg 60 has a first end region 60*a* that is connected to the second end region 58*b* of the second antenna leg 58. The third antenna leg 60 has a second end region 60*b* that extends away from the first end region 60*a* of the third antenna leg 60 in a direction that is opposite to the first direction. In the illustrated orientation, the second end region 60*b* extends towards the right. The fourth antenna leg 62 includes a first end region 62*a* that is connected to the second end region 60*b* of the third antenna leg 60. The fourth antenna leg 62 includes a second end region 62*b* that extends away from the first end region 62*a* of the fourth antenna leg 62 in a direction that is opposite to the second direction and toward the first antenna leg 56. In the illustrated orientation, the second end region 62*b*** extends in a vertically upward direction.

The multiband antenna 54 includes a fifth antenna leg 64 that extends parallel to the first antenna leg 56. The fifth antenna leg 64 includes a first end region 64*a* that is connected to the second end region 62*b* of the fourth antenna leg 62. A sixth antenna leg 66 has a first end region 66*a* that is configured to be electrically coupled to an antenna signal trace (such as the antenna signal trace 26 coupled to an impedance matching circuit). The sixth antenna leg 66 includes a second end region 66*b* that extends away from the first end region 66*a* of the sixth antenna leg 66 in a direction that is parallel with the first antenna leg 56 and is connected to the second antenna leg 58 at an intermediate location 58*c* along a length of the second antenna leg 58, the sixth antenna leg 66 spaced from the first antenna leg 56 by a first gap 68 along the length of the sixth antenna leg 66, and the sixth antenna leg 66 extends between the first antenna leg 56 and the fifth antenna leg 64 and spaced from the fifth antenna leg 64 by a second gap 70 along a length of the fifth antenna leg 64. As an example, the first gap 68 may be about 0.3 millimeters and the second gap 70 may be about 0.3 millimeters. In some instances, the fifth antenna leg 64 may be shorter in length than the first antenna leg 56 and shorter than the length of the sixth antenna leg. In some instances, the sixth antenna leg 66 may be shorter in length than the first antenna leg 56. In some cases, the first end region 64*a* of the fifth antenna leg 64 may be connected to the second end region 62*b* of the fourth antenna leg 62.

Figure 6:
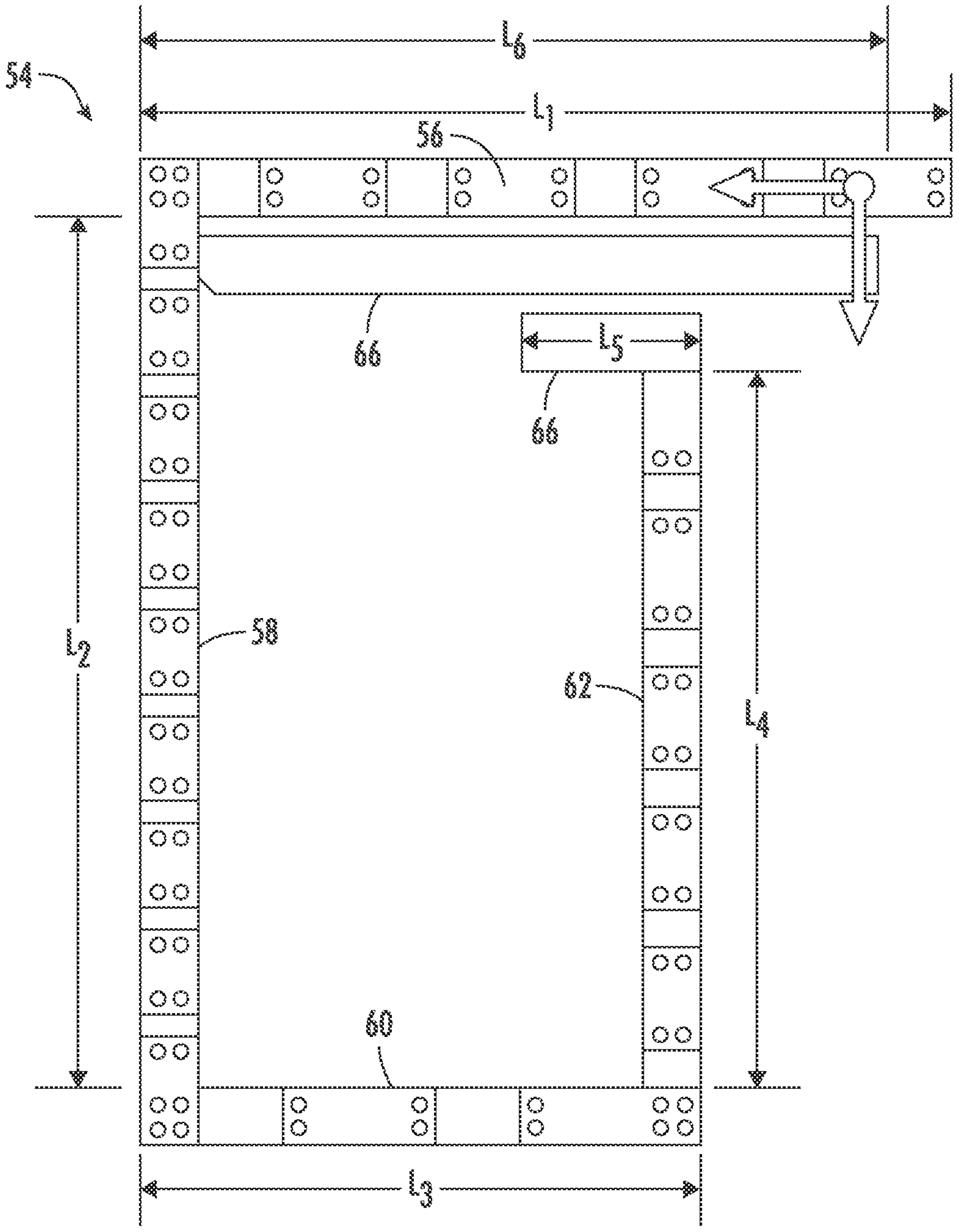
FIG. 6 is a schematic view of the illustrative multiband antenna of FIG. 5, with particular dimensions called out.

FIG. 6 is a schematic view of the illustrative multiband antenna 54 with various lengths denoted. The first antenna leg 56 may have a length $L_1$ that is about 14 millimeters and a width of about 1 millimeter. The term "about" is defined as being plus or minus up to twenty percent. Thus, "about 14 millimeters" would have a range of 11.2 millimeters to 16.8 millimeters and "about 1 millimeter" would range from 0.8 millimeters to 1.2 millimeters. The second antenna leg 58 may have a length $L_2$ that is about 15 millimeters and a width of about 1 millimeter. The third antenna leg 60 may have a length $L_3$ that is about 10 millimeters and a width of about 1 millimeter. The fourth antenna leg 62 may have a length $L_4$ that is about 13 millimeters and a width of about 1 millimeter. The fifth antenna leg 64 may have a length $L_5$ that is about 3 millimeters and a width of about 1 millimeter. The sixth antenna leg 66 may have a length $L_6$ that is about 12 millimeters and a width of about 1 millimeter.

Figure 7:
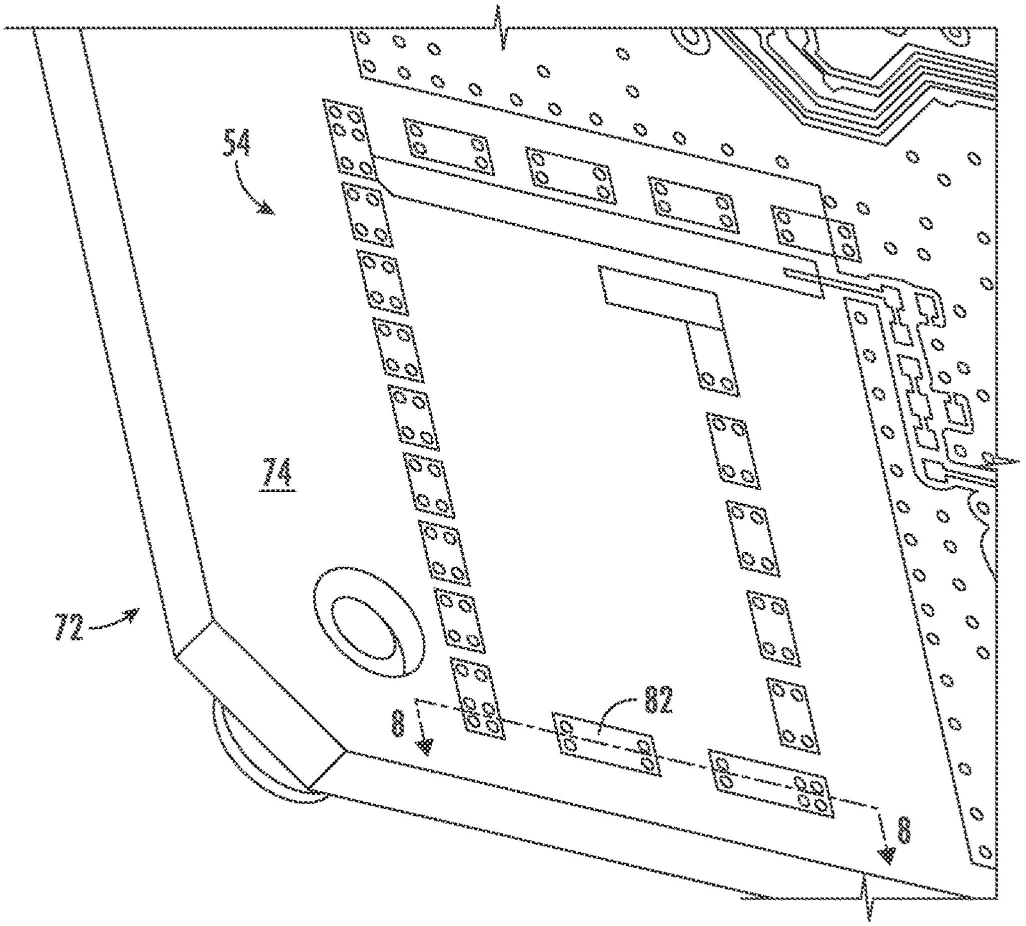
FIG. 7 is a perspective view of a portion of the printed circuit board shown in FIG. 1, including the illustrative multiband antenna of FIG. 5.
Figure 8:
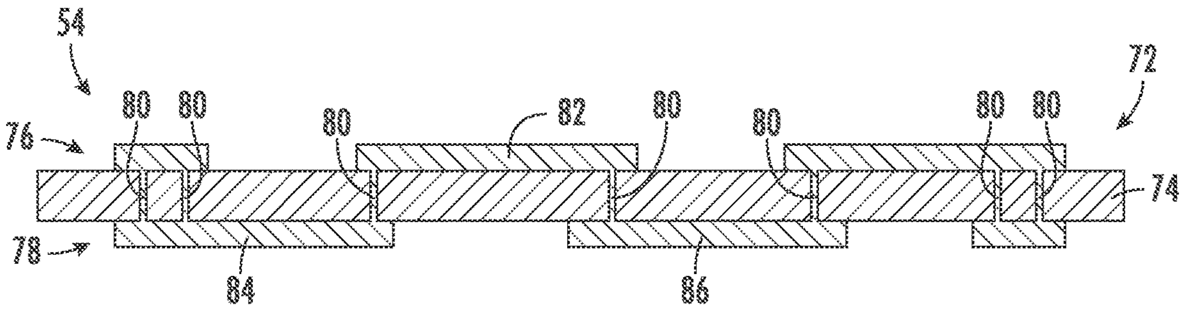
FIG. 8 is a cross-sectional view taken along the line 8-8 of FIG. 7.
Figure 9:
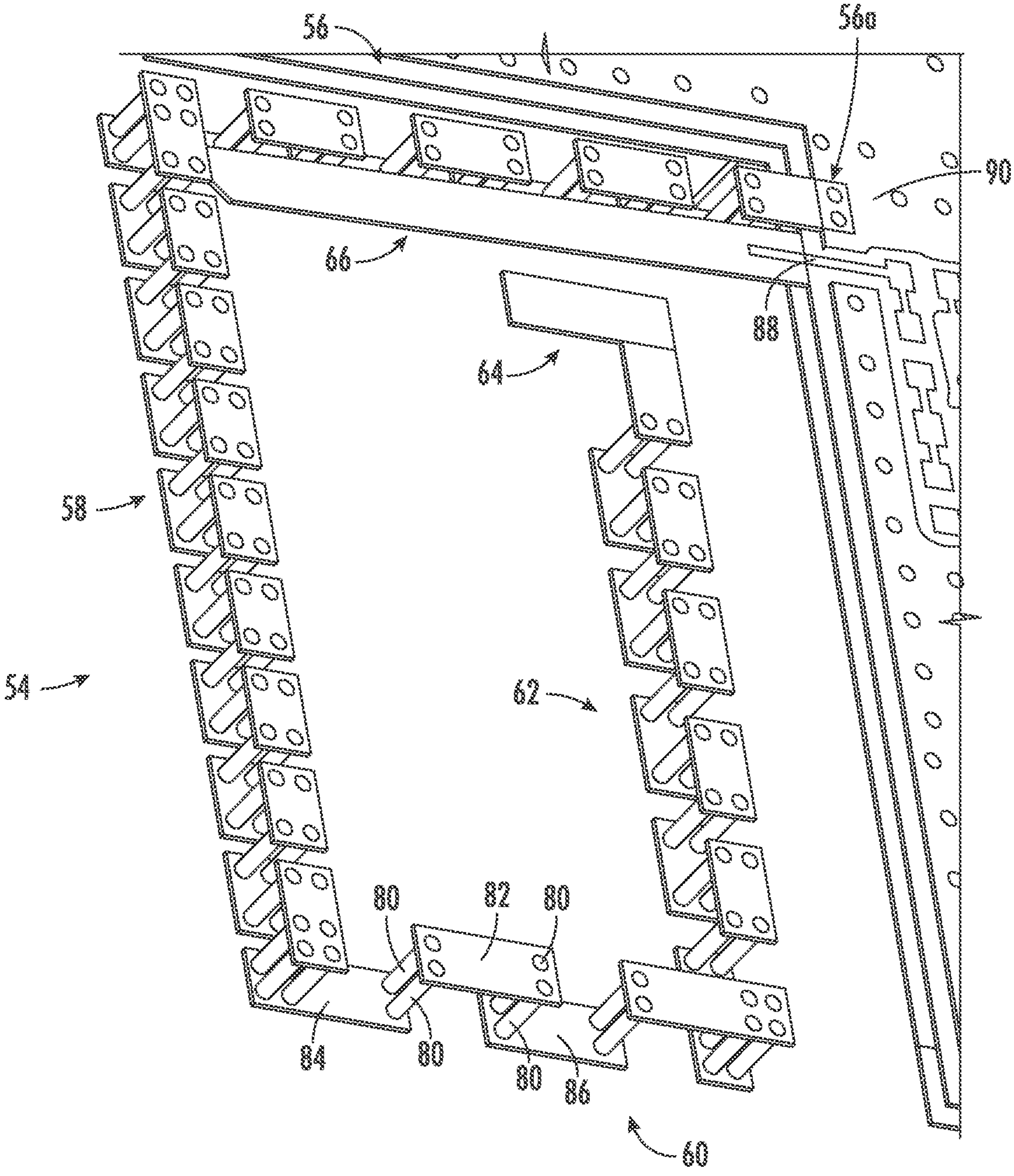
FIG. 9 is a perspective view of the illustrative multiband antenna of FIG. 5, with an intervening layer removed to show the dual layer nature of the illustrative multiband antenna of FIG. 5.

In some instances, the multiband antenna 54 may be formed as part of a printed circuit board (such as the PCB 10). As an example, each of the first antenna leg 56, the second antenna leg 58, the third antenna leg 60, the fourth antenna leg 62, the fifth antenna leg 64 and the sixth antenna leg 66 may each be formed using metal traces of a printed circuit board. In some instances, the multiband antenna 54 may be a multi-layer construction. FIG. 7 is a top perspective view of a printed circuit board 72 including the multiband antenna 54. FIG. 8 is a cross-sectional view of the printed circuit board 72, taken along the line 8-8 of FIG. 7. FIG. 9 is a perspective view of the multiband antenna 54, showing the metal layers of the multiband antenna 54 with an intervening dielectric layer (e.g. FR4) 74 removed for clarity.

The illustrative printed circuit board 72 includes a conductive layer 76 that as shown in FIG. 8 is positioned above (in the illustrated orientation) the dielectric layer 74 and a conductive layer 78 that is positioned below the dielectric layer 74. Each of the first antenna leg 56, the second antenna leg 58, the third antenna leg 60, the fourth antenna leg 62, the fifth antenna leg 64 and the sixth antenna leg 66 may be formed of alternating segments, with some segments being part of the conductive layer 76 and some segments being part of the conductive layer 78. A number of Vias 80 extend between the conductive layer 76 and the conductive layer 78 in order to electrically couple adjacent metal segments. In some instances, forming each of the of the first antenna leg 56, the second antenna leg 58, the third antenna leg 60, the fourth antenna leg 62, the fifth antenna leg 64 and the sixth antenna leg 66 of alternating metal segments, where each metal segment has neighboring metal segments physically separated from the metal segments via the intervening dielectric layer 74, can effectively increase the electrical length of each of the first antenna leg 56, the second antenna leg 58, the third antenna leg 60, the fourth antenna leg 62, the fifth antenna leg 64 and the sixth antenna leg 66.

In some instances, one or more of the first antenna leg 56, the second antenna leg 58, the third antenna leg 60, the fourth antenna leg 62, the fifth antenna leg 64 and the sixth antenna leg 66 include a plurality of series connected metal segments, wherein each of the plurality of series connected metal segments is electrically connected to at least two neighboring metal segment in the plurality of series connected metal segments, and wherein each of the plurality of series connected metal segments is formed on a different metal layer of the printed circuit board than each of the at least two neighboring metal segment and is connected to each of the at least two neighboring metal segment through one or more Vias 80 of the printed circuit board 72. In some cases, one or more of the first antenna leg 56, the second antenna leg 58, the third antenna leg 60, the fourth antenna leg 62, the fifth antenna leg 64 and the sixth antenna leg 66 each include at least four series connected metal segments that alternate between a first metal conductive layer 76 and a second metal conductive layer 78 of the printed circuit board 72 and are series connected using Vias 80 of the printed circuit board 72.

To illustrate, consider a portion of the third antenna leg 60 that includes a metal segment 82, a metal segment 84 and a metal segment 86 (see, for example, FIG. 8). The metal segment 82 is formed as part of the conductive layer 76. The metal segment 84 and the metal segment 86 are each formed as part of the conductive layer 78, and thus are spaced apart from the metal segment 82 by the dielectric layer (e.g. FR4) 74 (removed for clarity in FIG. 9). The metal segment 82 is electrically coupled with the metal segment 84 and the metal segment 86 by a number of Vias 80 that extend between the conductive layer 76 and the conductive layer 78. In some instances, the first end region 66*a* of the sixth antenna leg 66 may be electrically coupled with an antenna signal trace 88. The antenna signal trace 88 may be considered as being an example of the antenna signal trace 26 schematically shown in FIG. 2. The first end region 56*a* of the first antenna leg 56 may be electrically coupled with a ground plane 90, which may be considered as an example of the ground 16.

Figure 10:
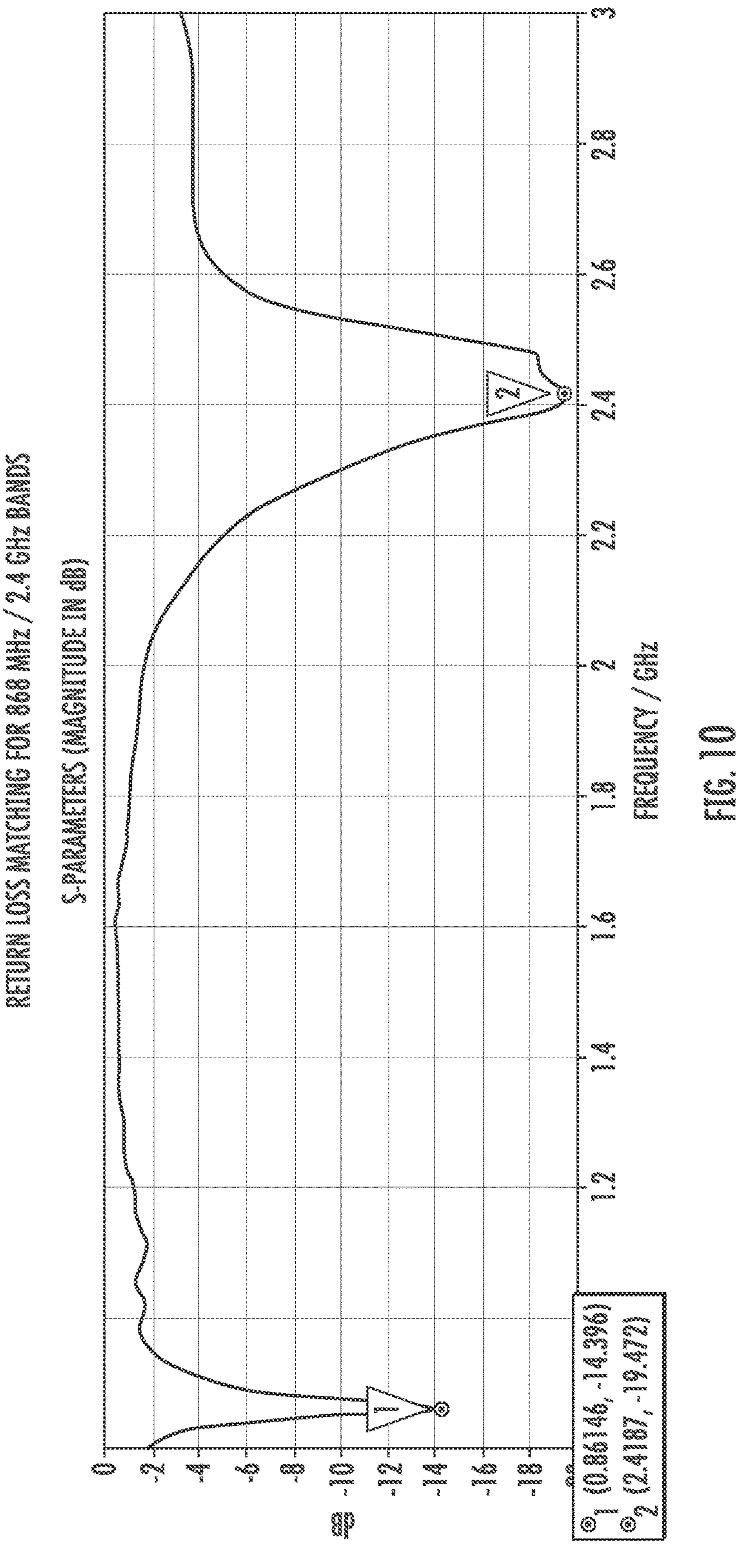
FIG. 10 is a graph showing return loss of the antenna shown in FIG. 6 with an impedance-matching circuit tuned for 868 MHz and 2.4 GHz frequencies.
Figure 11:
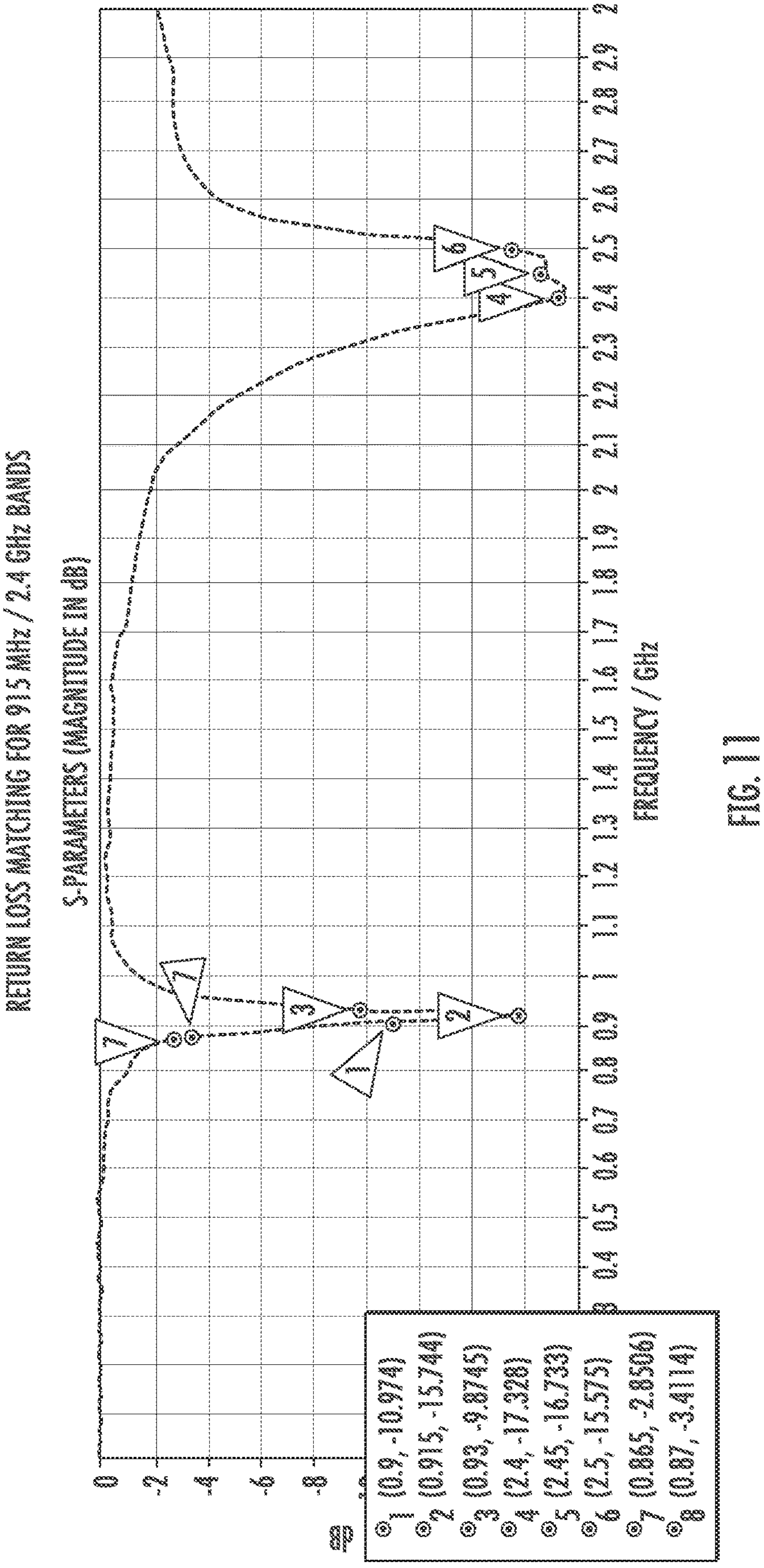
FIG. 11 is a graph showing return loss of the antenna shown in FIG. 6 with an impedance-matching circuit tuned for 915 MHz and 2.4 GHz frequencies.

FIG. 10 is a graph showing return loss of the antenna shown in FIG. 6 with an impedance-matching circuit tuned for 868 MHz and 2.4 GHz frequencies. FIG. 10 shows results for the multiband antenna 54 used in combination with an impedance-matching circuit (such as the impedance-matching circuitry 32) to produce a first trough (in return loss) around 868 Mhz and a second trough (in return loss) around 2.4 GHz. FIG. 11 is a graph showing return loss of the antenna shown in FIG. 6 with an impedance-matching circuit tuned for 915 MHz and 2.4 GHz frequencies. FIG. 11 shows results for the multiband antenna 54 used in combination with an impedance-matching circuit (such as the impedance-matching circuitry 44) to produce a first trough (in return loss) around 915 Mhz and a second trough (in return loss) around 2.4 GHZ.

Figure 12:
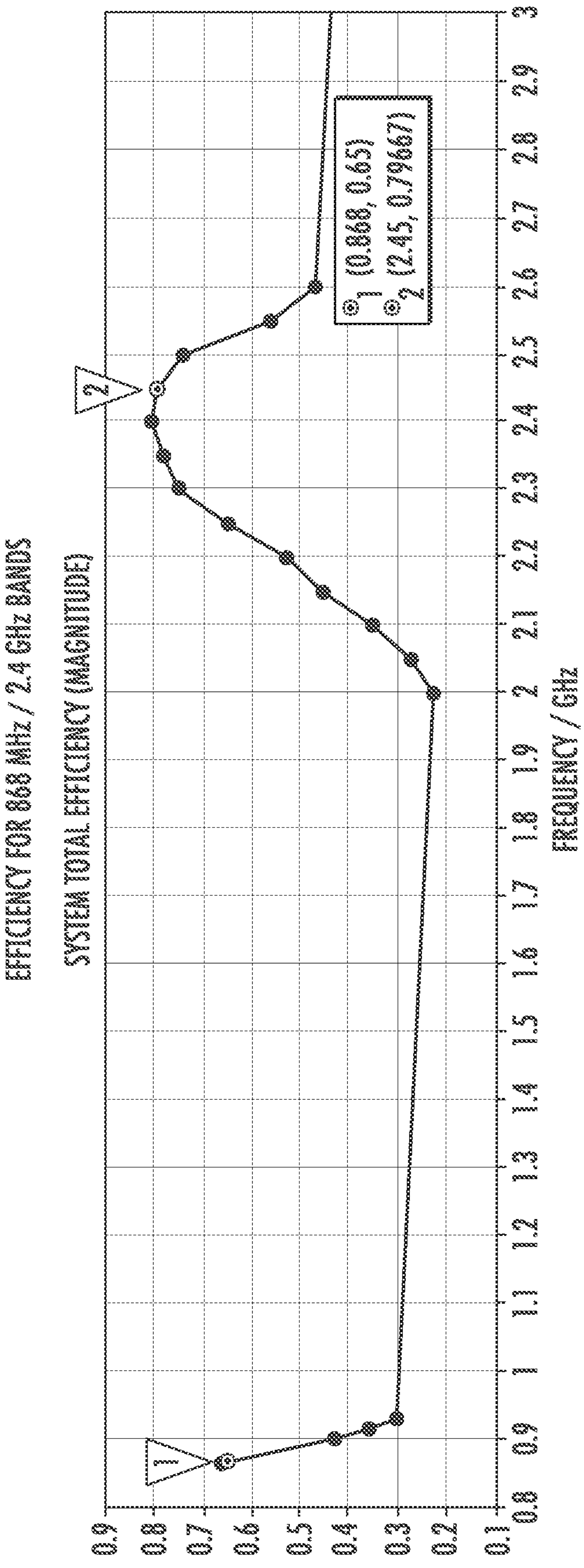
FIG. 12 is a graph showing efficiency of the antenna shown in FIG. 6 with an impedance-matching circuit tuned for 868 MHz and 2.4 GHz frequencies.
Figure 13:
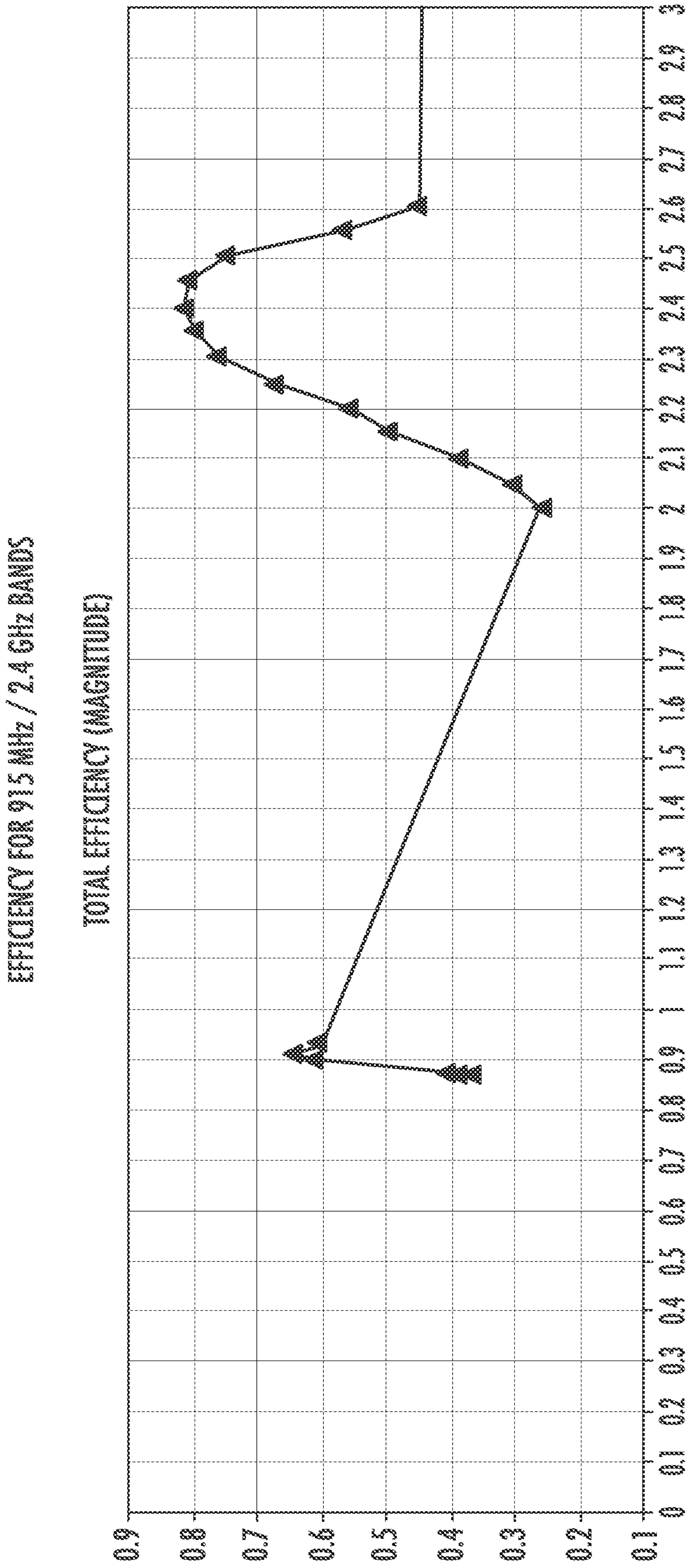
FIG. 13 is a graph showing efficiency of the antenna shown in FIG. 6 with an impedance-matching circuit tuned for 915 MHz and 2.4 GHz frequencies.

FIG. 12 is a graph showing efficiency of the antenna shown in FIG. 6 with an impedance-matching circuit tuned for 868 MHz and 2.4 GHz frequencies. FIG. 12 shows results for the multiband antenna 54 used in combination with an impedance-matching circuit (such as the impedance-matching circuitry 32) to produce a first peak (in efficiency) around 868 Mhz and a second peak (in efficiency) around 2.4 GHz. FIG. 11 is a graph showing efficiency of the antenna shown in FIG. 6 with an impedance-matching circuit tuned for 915 MHz and 2.4 GHz frequencies. FIG. 13 shows results for the multiband antenna 54 used in combination with an impedance-matching circuit (such as the impedance-matching circuitry 44) to produce a first peak (in efficiency) around 915 Mhz and a second peak (in efficiency) around 2.4 GHz.

Some of the matter disclosed herein may be of a hypothetical or prophetic nature although stated in another manner or tense. Although the present system and/or approach has been described with respect to at least one illustrative example, many variations and modifications will become apparent to those skilled in the art upon reading the specification. This may include, to the extent that it is appropriate, the use of any of the features of one example embodiment being used in other embodiments. It is therefore the intention that the appended claims be interpreted as broadly as possible in view of the related art to include all such variations and modifications.

What is claimed is:

1. A printed circuit board implemented multiband antenna, comprising a first antenna leg supported by a printed circuit board, the first antenna leg having a length, with a first end region of the first antenna leg operatively connected to a ground plane of the printed circuit board and a second end region of the first antenna leg extending away from the first end region of the first antenna leg in a first direction;

a second antenna leg supported by the printed circuit board, the second antenna leg having a length, with a first end region of the second antenna leg connected to the second end region of the first antenna leg, and with a second end region of the second antenna leg extending away from the first end region of the second antenna leg in a second direction that is orthogonal to the first direction;

a third antenna leg supported by the printed circuit board, the third antenna leg having a length, with a first end region of the third antenna leg connected to the second end region of the second antenna leg, and with a second end region of the third antenna leg extending away from the first end region of the third antenna leg in a direction that is opposite to the first direction;

a fourth antenna leg supported by the printed circuit board, the fourth antenna leg having a length, with a first end region of the fourth antenna leg connected to the second end region of the third antenna leg, and with a second end region of the fourth antenna leg extending away from the first end region of the fourth antenna leg in a direction that is opposite to the second direction and toward the first antenna leg;

a fifth antenna leg supported by the printed circuit board, the fifth antenna leg having a length extending parallel to the first antenna leg with the fifth antenna leg connected to the second end region of the fourth antenna leg; and a sixth antenna leg supported by the printed circuit board, the sixth antenna leg having a length, with a first end region of the sixth antenna leg electrically coupled to an antenna signal trace of the printed circuit board, and with a second end region of the sixth antenna leg extending away from the first end region of the sixth antenna leg in a direction that is parallel with the first antenna leg and is connected to the second antenna leg at an intermediate location along the length of the second antenna leg, the sixth antenna leg spaced from the first antenna leg by a first gap along the length of the sixth antenna leg, and the sixth antenna leg extending between the first antenna leg and the fifth antenna leg and spaced from the fifth antenna leg by a second gap along the length of the fifth antenna leg.

2. The printed circuit board implemented multiband antenna of claim 1, wherein the length of the fifth antenna leg is shorter than the length of the first antenna leg and shorter than the length of the sixth antenna leg.

3. The printed circuit board implemented multiband antenna of claim 1, wherein the length of the sixth antenna leg is shorter than the length of the first antenna leg.

4. The printed circuit board implemented multiband antenna of claim 1, wherein a first end region of the fifth antenna leg is connected to the second end region of the fourth antenna leg.

5. The printed circuit board implemented multiband antenna of claim 1, wherein:

the first antenna leg has a length of about 14 millimeters and a width of about 1 millimeter;

the second antenna leg has a length of about 15 millimeters and a width of about 1 millimeter;

the third antenna leg has a length of about 10 millimeters and a width of about 1 millimeter;

the fourth antenna leg has a length of about 13 millimeters and a width of about 1 millimeter;

the fifth antenna leg has a length of about 3 millimeters and a width of about 1 millimeter; and the sixth antenna leg has a length of about 12 millimeters and a width of about 1 millimeter.

6. The printed circuit board implemented multiband antenna of claim 2, wherein the first gap is about 0.3 millimeters and the second gap is about 0.3 millimeters.

7. The printed circuit board implemented multiband antenna of claim 1, comprising a first band with a return loss of less than −10 Db at 868 MHz and a second band with a return loss of less than −10 Db at 2.4 GHz.

8. The printed circuit board implemented multiband antenna of claim 1, comprising a first band with a return loss of less than −10 Db at 915 MHz and a second band with a return loss of less than −10 Db at 2.4 GHz.

9. The printed circuit board implemented multiband antenna of claim 1, comprising a first band with a return loss of less than −10 Db at 868 MHz, a second band with a return loss of less than −10 Db at 915 MHz and a third band with a return loss of less than −10 Db at 2.4 GHz.

10. The printed circuit board implemented multiband antenna of claim 1, wherein the first antenna leg, the second antenna leg, the third antenna leg, the fourth antenna leg, the fifth antenna leg and the sixth antenna leg collectively fit within a rectangular area on the printed circuit board of less than 400 square millimeters.

11. The printed circuit board implemented multiband antenna of claim 1, wherein the first antenna leg, the second antenna leg, the third antenna leg, the fourth antenna leg, the fifth antenna leg and the sixth antenna leg are each are formed using traces of the printed circuit board.

12. The printed circuit board implemented multiband antenna of claim 1, wherein the printed circuit board has a plurality of different metal layers, and wherein one or more of the first antenna leg, the second antenna leg, the third antenna leg, the fourth antenna leg, the fifth antenna leg and the sixth antenna leg include a plurality of series connected metal segments, wherein each of the plurality of series connected metal segments is electrically connected to at least two neighboring metal segment in the plurality of series connected metal segments, and wherein each of the plurality of series connected metal segments is formed on a different metal layer of the printed circuit board than each of the at least two neighboring metal segment and is connected to each of the at least two neighboring metal segment through one or more VIAS of the printed circuit board.

13. The printed circuit board implemented multiband antenna of claim 12, wherein one or more of the first antenna leg, the second antenna leg, the third antenna leg, the fourth antenna leg, the fifth antenna leg and the sixth antenna leg each include at least four series connected metal segments that alternate between a first metal layer and a second metal layer of the plurality of different metal layers of the printed circuit board and are series connected using VIAS of the printed circuit board.

14. The printed circuit board implemented multiband antenna of claim 1, wherein the antenna signal trace of the printed circuit board is operatively coupled to filter circuitry and/or amplifier circuitry mounted to the printed circuit board.

15. The printed circuit board implemented multiband antenna of claim 1, wherein the antenna signal trace of the printed circuit board is operatively coupled to circuitry mounted to the printed circuit board, wherein the circuitry is impedance matched to the printed circuit board implemented multiband antenna.

16. A printed circuit board implemented antenna, comprising an antenna leg supported by a printed circuit board, the printed circuit board having a plurality of different metal layers;

the antenna leg having a length extending between a first end and a second end of the antenna leg, the antenna leg including a plurality of series connected metal segments; and wherein each of at least two of the plurality of series connected metal segments is electrically connected to at least two neighboring metal segment of the plurality of series connected metal segments, and wherein each of the at least two of the plurality of series connected metal segments is formed on a different metal layer of the printed circuit board than each of the at least two neighboring metal segment and is connected to each of the at least two neighboring metal segment through one or more Vias of the printed circuit board.

17. The printed circuit board implemented antenna of claim 16, wherein the antenna leg includes at least four series connected metal segments that alternate between a first metal layer and a second metal layer of the plurality of different metal layers of the printed circuit board and are series connected using Vias of the printed circuit board.

18. The printed circuit board implemented antenna of claim 16, comprising:

a plurality of antenna legs each supported by the printed circuit board;

each of the plurality of antenna legs having a length extending between a first end and a second end of the respective antenna leg, with the respective antenna leg including a plurality of series connected metal segments; and wherein each of at least two of the plurality of series connected metal segments of the respective antenna leg is electrically connected to at least two neighboring metal segment in the plurality of series connected metal segments of the respective antenna leg, and wherein each of the plurality of series connected metal segments of the respective antenna leg is formed on a different metal layer of the printed circuit board than each of the at least two neighboring metal segment of the respective antenna leg and is connected to each of the at least two neighboring metal segment of the respective antenna leg through one or more Vias of the printed circuit board.

19. A printed circuit board implemented multiband antenna, comprising:

a plurality of antenna legs arranged within a rectangular area on a printed circuit board of less than 260 millimeters square with each formed using one or more metal layers of the printed circuit board, the plurality of antenna legs arranged to support two different antenna modes in accordance with a selected one of two impedance-matching circuits of an antenna driving circuit, including:

a first antenna mode that includes a first band with a return loss of less than −10 Db at 868 MHz and a second band with a return loss of less than −10 Db at 2.4 GHz; and a second antenna mode that includes a third band with a return loss of less than −10 Db at 915 MHz and the second band with a return loss of less than −10 Db at 2.4 GHz;

wherein one or more of the plurality of antenna legs include at least four series connected metal segments that alternate between a first metal layer and a second metal layer of a plurality of different metal layers of the printed circuit board and are series connected using Vias of the printed circuit board.

* * * * *